(12) United States Patent
Couture et al.

(10) Patent No.: US 11,999,422 B2
(45) Date of Patent: Jun. 4, 2024

(54) TRACK SYSTEM FOR A VEHICLE

(71) Applicant: CAMSO INC., Magog (CA)

(72) Inventors: Frederic Couture, Sherbrooke (CA); David Gingras, Magog (CA); Martin Tremblay, Montreal (CA)

(73) Assignee: CAMSO INC., Magog (CA)

( * ) Notice: Subject to any disclaimer, the term of this patent is extended or adjusted under 35 U.S.C. 154(b) by 943 days.

(21) Appl. No.: 16/962,723

(22) PCT Filed: Jan. 15, 2019

(86) PCT No.: PCT/CA2019/050048
§ 371 (c)(1),
(2) Date: Nov. 10, 2020

(87) PCT Pub. No.: WO2019/140513
PCT Pub. Date: Jul. 25, 2019

(65) Prior Publication Data
US 2021/0053632 A1     Feb. 25, 2021

Related U.S. Application Data

(60) Provisional application No. 62/617,765, filed on Jan. 16, 2018.

(51) Int. Cl.
*B62D 55/24*       (2006.01)
*B62D 55/08*       (2006.01)
(Continued)

(52) U.S. Cl.
CPC ........... *B62D 55/244* (2013.01); *B62D 55/08* (2013.01); *B62D 55/125* (2013.01); *B62D 55/14* (2013.01); *E02F 9/26* (2013.01)

(58) Field of Classification Search
CPC ...... B62D 55/244; B62D 55/14; B62D 55/08; B62D 55/125
See application file for complete search history.

(56) References Cited

U.S. PATENT DOCUMENTS 3,776,598 A * 12/1973 Nichols ................ B62D 55/244
                                                      305/168
4,513,833 A    4/1985 Sheldon
(Continued)

FOREIGN PATENT DOCUMENTS

CA    1219622    3/1987
CA    2793418    4/2014
(Continued)

OTHER PUBLICATIONS

Translation of KR 100723248 B1, 5 pages (Year: 2007).*
(Continued)

*Primary Examiner* — S. Joseph Morano
*Assistant Examiner* — Emily G. Castonguay
(74) *Attorney, Agent, or Firm* — Hahn Loeser & Parks LLP; Bret A. Hrivnak

(57) ABSTRACT

A resistance to wear, "edge-cutting" or other deterioration of a track for a vehicle and/or other aspects of the track may be enhanced, including by enhancing internal reinforcements (e.g., cores) of the track, such as by providing certain flexibility characteristics to these internal reinforcements of the track, and/or by monitoring the track and controlling the vehicle, notifying a user, etc.

34 Claims, 39 Drawing Sheets

(51) Int. Cl.
    *B62D 55/125*     (2006.01)
    *B62D 55/14*     (2006.01)
    *E02F 9/26*     (2006.01)

(56) References Cited

U.S. PATENT DOCUMENTS

| | | | |
|---|---|---|---|
| 5,372,212 | A | 12/1994 | Davis |
| 6,935,708 | B2 | 8/2005 | Courtemanche |
| 8,590,986 | B2 | 11/2013 | Kim et al. |
| 2003/0102715 | A1* | 6/2003 | Watanabe ............ B62D 55/244 305/177 |
| 2006/0284484 | A1 | 12/2006 | Gleasman |
| 2008/0129111 | A1 | 6/2008 | Pringiers |
| 2015/0191173 | A1 | 7/2015 | Lussier et al. |
| 2016/0001830 | A1* | 1/2016 | Matsuo ............ B62D 55/244 305/170 |
| 2017/0151987 | A1* | 6/2017 | Mizusawa ............ B62D 55/244 |
| 2019/0016399 | A1* | 1/2019 | Dumoulin ............ B62D 55/244 |

FOREIGN PATENT DOCUMENTS

| | | | |
|---|---|---|---|
| EP | 3740420 | 11/2020 | |
| KR | 100723248 B1 * | 5/2007 | ........... B62D 55/244 |
| WO | 9912799 | 3/1999 | |
| WO | 2016176780 | 11/2016 | |
| WO | WO 2019140513 A1 | 7/2019 | |

OTHER PUBLICATIONS

Written Opinion dated Apr. 26, 2019 in connection with International PCT Patent Application No. PCT/CA2019/050048, 8 pages.
International Search Report dated Apr. 26, 2019 in connection with International PCT Patent Application No. PCT/CA2019/050048, 5 pages.
Extended European Search Report dated Sep. 15, 2021, in connection with European Patent Application No. 19741080.6, 9 pages.

* cited by examiner

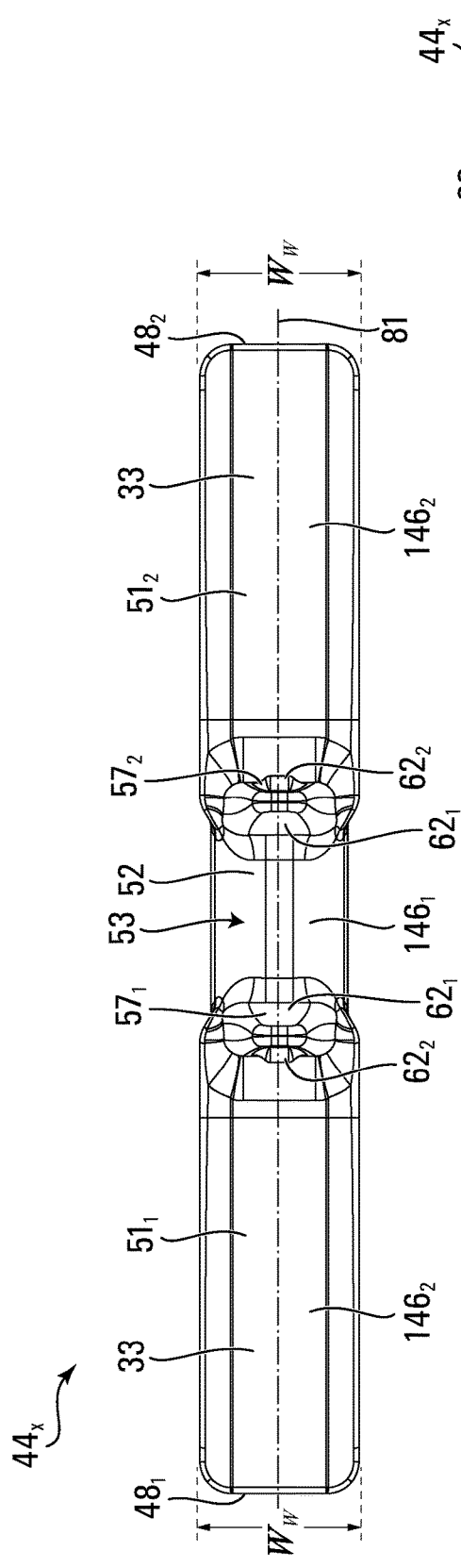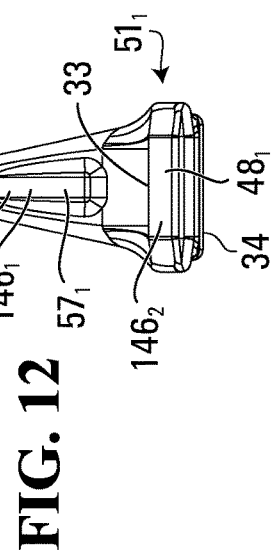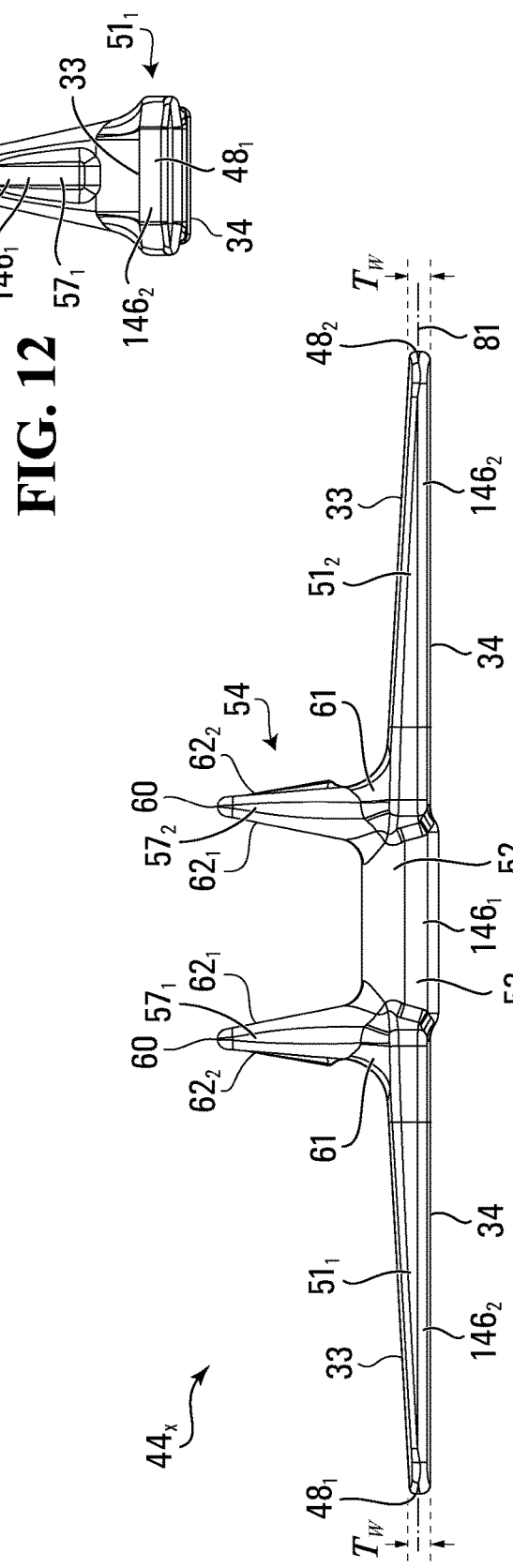

TRACK SYSTEM FOR A VEHICLE

CROSS-REFERENCE TO RELATED APPLICATION

This application claims priority from U.S. Provisional Patent Application 62/617,765 filed on Jan. 16, 2018 and incorporated by reference herein.

FIELD

This disclosure relates generally to off-road vehicles and, more particularly, to off-road vehicles comprising tracks.

BACKGROUND

Certain off-road vehicles, including industrial vehicles such as construction vehicles (e.g., loaders, bulldozers, excavators, etc.), agricultural vehicles (e.g., harvesters, combines, tractors, etc.), and forestry vehicles (e.g., fellerbunchers, tree chippers, knuckleboom loaders, etc.), as well as military vehicles (e.g., combat engineering vehicles (CEVs), etc.), to name a few, may be equipped with elastomeric tracks which enhance their traction and floatation on soft, slippery and/or irregular grounds (e.g., soil, mud, sand, ice, snow, etc.) on which they operate.

Elastomeric tracks may be constructed in various ways, often comprising internal reinforcements in their elastomeric material. For example, an elastomeric track may comprise transversal cores embedded in its elastomeric material (e.g., rubber) and spaced apart in the track's longitudinal direction to impart transversal rigidity to the track and possibly interact with wheels (e.g., a drive wheel and/or roller wheels) around which the track is disposed. For instance, in some cases, the track may comprise transversal metallic cores embedded in its elastomeric material. Each metallic core may comprise one or more wheel-engaging projections for interacting with one or more of the wheels around which the track is disposed to guide and/or drive the track.

Issues may arise when a track contacts a curb or other object on the ground. For example, this may cause failure or damage of cores or other internal reinforcements of the track, which may need to be robust. As another example, this may cause wear or "edge-cutting" of the elastomeric material of the track. As yet another example, the cores or other internal reinforcement may become exposed and this may cause a progressive loss of adhesion between them and the track's elastomeric material due to, for instance, infiltration of rocks, sand, water and/or other undesirable matter between the internal reinforcements and the elastomeric material.

For these and other reasons, there is a need for improvements relating to off-road vehicles comprising tracks.

SUMMARY

In accordance with various aspects, this disclosure relates to enhancing a resistance to wear, "edge-cutting" or other deterioration of a track for a vehicle and/or other aspects of the track, including by enhancing internal reinforcements (e.g., cores) of the track, such as by providing certain flexibility characteristics to these internal reinforcements of the track, and/or by monitoring the track and controlling the vehicle, notifying a user, etc.

According to an aspect, this disclosure relates to a track for a vehicle. The track is mountable around a track-engaging assembly. The track assembly comprises a plurality of wheels. The track comprises: a ground-engaging outer side; an inner side opposite to the ground-engaging outer side and comprising a plurality of wheel-contacting projections for contacting the wheels; elastomeric material allowing the track to flex around the track-engaging assembly; and a plurality of cores disposed in the elastomeric material, extending transversally to a longitudinal direction of the track, and spaced apart in the longitudinal direction of the track. Each core comprises: a wheel engager for engaging the wheels; and a pair of wings extending from the wheel engager in a longitudinal direction of the core. The wheel engager is disposed between the wings in the longitudinal direction of the core. Each wing is configured to flex in the longitudinal direction of the core to allow the wing to deflect in a thicknesswise direction of the track.

According to another aspect, this disclosure relates to a track for a vehicle. The track is mountable around a track-engaging assembly. The track assembly comprises a plurality of wheels. The track comprises: a ground-engaging outer side; an inner side opposite to the ground-engaging outer side; elastomeric material allowing the track to flex around the track-engaging assembly; and an internal reinforcement disposed in the elastomeric material. A stiffness of the internal reinforcement is variable during use of the track.

According to another aspect, this disclosure relates to a system for use in respect of a vehicle comprising a track for traction of the vehicle. The track is mounted around a track-engaging assembly comprising a plurality of wheels. The track is elastomeric and comprises a ground-engaging outer surface and an inner surface opposite to the ground-engaging outer surface. The system comprises a monitoring device and a processing entity that is configured to issue a signal based on an output of the monitoring device regarding the track contacting an object on the ground.

According to another aspect, this disclosure relates to a track system for a vehicle. The track system comprises: a track that is elastomeric and comprises a ground-engaging outer surface and an inner surface opposite to the ground-engaging outer surface; and a track-engaging assembly comprising a plurality of wheels and configured to move the track around the track-engaging assembly.

The track system comprises a monitoring device configured to issue a signal regarding the track contacting an object on the ground.

According to another aspect, this disclosure relates to a track for of a vehicle. The track is mountable around a track-engaging assembly comprising a plurality of wheels. The track is elastomeric and comprises: a ground-engaging outer surface; an inner surface opposite to the ground-engaging outer surface; and a sensor configured to issue a signal regarding the track contacting an object on the ground.

These and other aspects of this disclosure will now become apparent to those of ordinary skill in the art upon review of a description of embodiments in conjunction with accompanying drawings.

BRIEF DESCRIPTION OF DRAWINGS

A detailed description of embodiments is provided below, by way of example only, with reference to accompanying drawings, in which:

FIGS. 9 to 13 show a core of the track in accordance with an embodiment;

It is to be expressly understood that the description and drawings are only for purposes of illustrating embodiments and are an aid for understanding. They are not limiting.

DETAILED DESCRIPTION OF EMBODIMENTS

Figure 1:
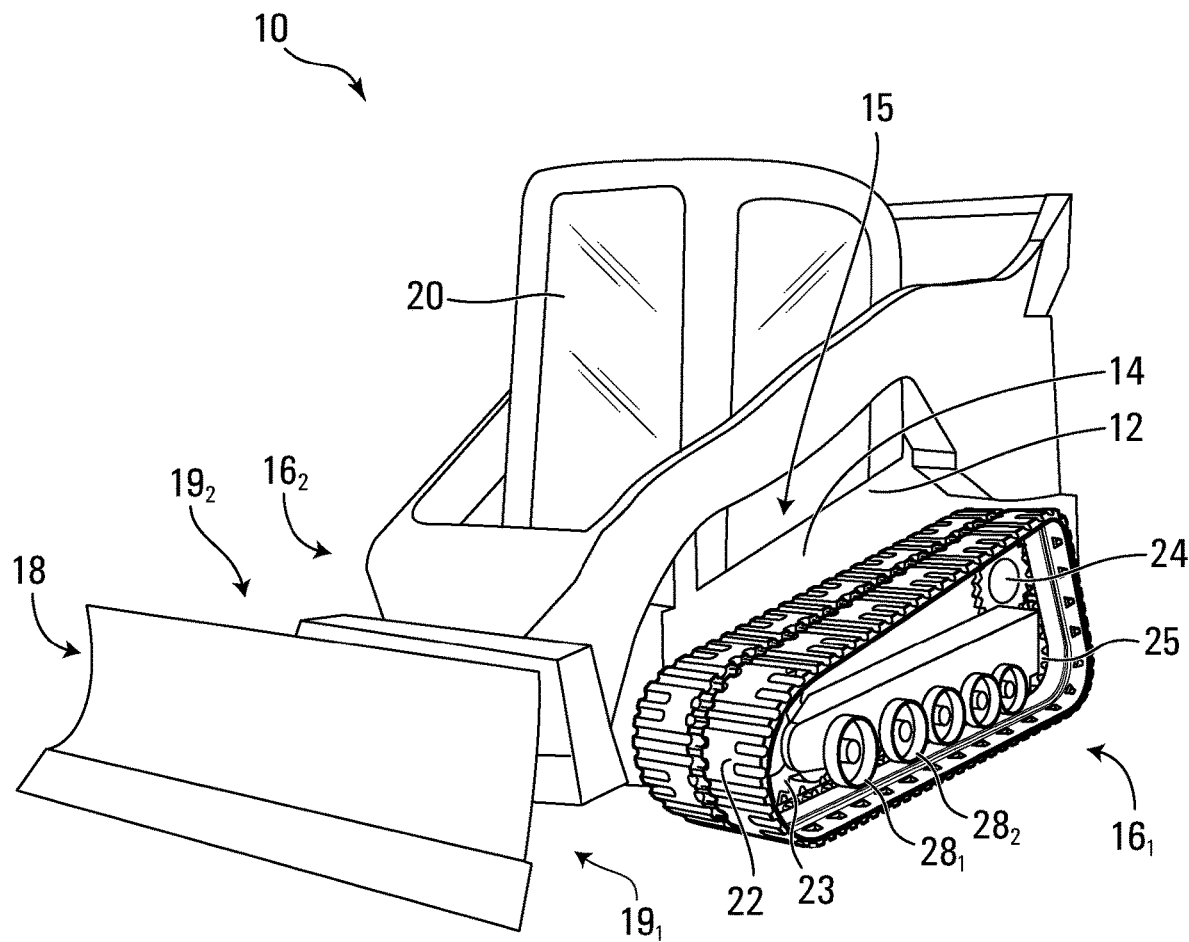
FIG. 1 shows an example of an off-road vehicle comprising a track in accordance with an embodiment.

FIG. 1 shows an example of an embodiment of a vehicle 10 comprising track systems $16_1$, $16_2$. Each of the track systems $16_1$, $16_2$ comprises a track 22 to engage the ground. In this embodiment, the vehicle 10 is a heavy-duty work vehicle for performing construction, agricultural, or other industrial work or military work. More particularly, in this embodiment, the vehicle 10 is a construction vehicle. Specifically, in this example, the construction vehicle 10 is a compact track loader. The vehicle 10 comprises a frame 12, a powertrain 15, and an operator cabin 20 for an operator to move the vehicle 10 on the ground to perform work using a work implement 18.

As further discussed below, in this embodiment, a resistance to wear, "edge-cutting" or other deterioration of the track 22 of each of the track systems $16_1$, $16_2$ and/or other aspects of the track 22 may be enhanced, including by enhancing internal reinforcements (e.g., cores) of the track 22, such as by providing certain flexibility characteristics to these internal reinforcements of the track 22, and/or by monitoring the track 22 and controlling the vehicle 10, notifying a user, etc.

The powertrain 15 is configured to generate motive power for the track systems $16_1$, $16_2$ to propel the vehicle 10 on the ground. To that end, the powertrain 15 comprises a prime mover 14 which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). Motive power generated by the prime mover 14 is applied to the track systems $16_1$, $16_2$. In some embodiments, the powertrain 15 may transmit power from the prime mover 14 to the track systems $16_1$, $16_2$ (e.g., via a transmission, a differential, and/or any other suitable mechanism). In other embodiments, at least part of the powertrain 15 (e.g., a motor and/or a transmission) may be part of one or more of the track systems $16_1$, $16_2$.

The operator cabin 20 comprises a user interface 11 that allow the operator to interact with the vehicle 10, including to steer the vehicle 10 on the ground, use the work implement 18, and control other aspects of the vehicle 10. For example, the user interface 11 comprises an accelerator, a brake control, and a steering device that can be used by the operator to control motion of the vehicle 10 on the ground, as well as controls to operate the work implement 18. The user interface 11 may also comprise an instrument panel (e.g., a dashboard) which provides indicators (e.g., a speedometer indicator, a tachometer indicator, etc.) to convey information to the operator.

The work implement 18 is operable to perform work. In this embodiment, the work implement 18 comprises a bucket for moving soil, debris or other material. In this example, the vehicle 10 comprises support arms $19_1$, $19_2$ carrying the work implement 18 and mounted to a rear part 21 of the frame 12 so that they extend forwardly pass the operator cabin 20. In other embodiments, the work implement 18 may comprise a dozer blade, a backhoe, a fork, a grapple, a scraper pan, an auger, a saw, a ripper, a material-handling arm, or any other type of work implement.

Figure 2:
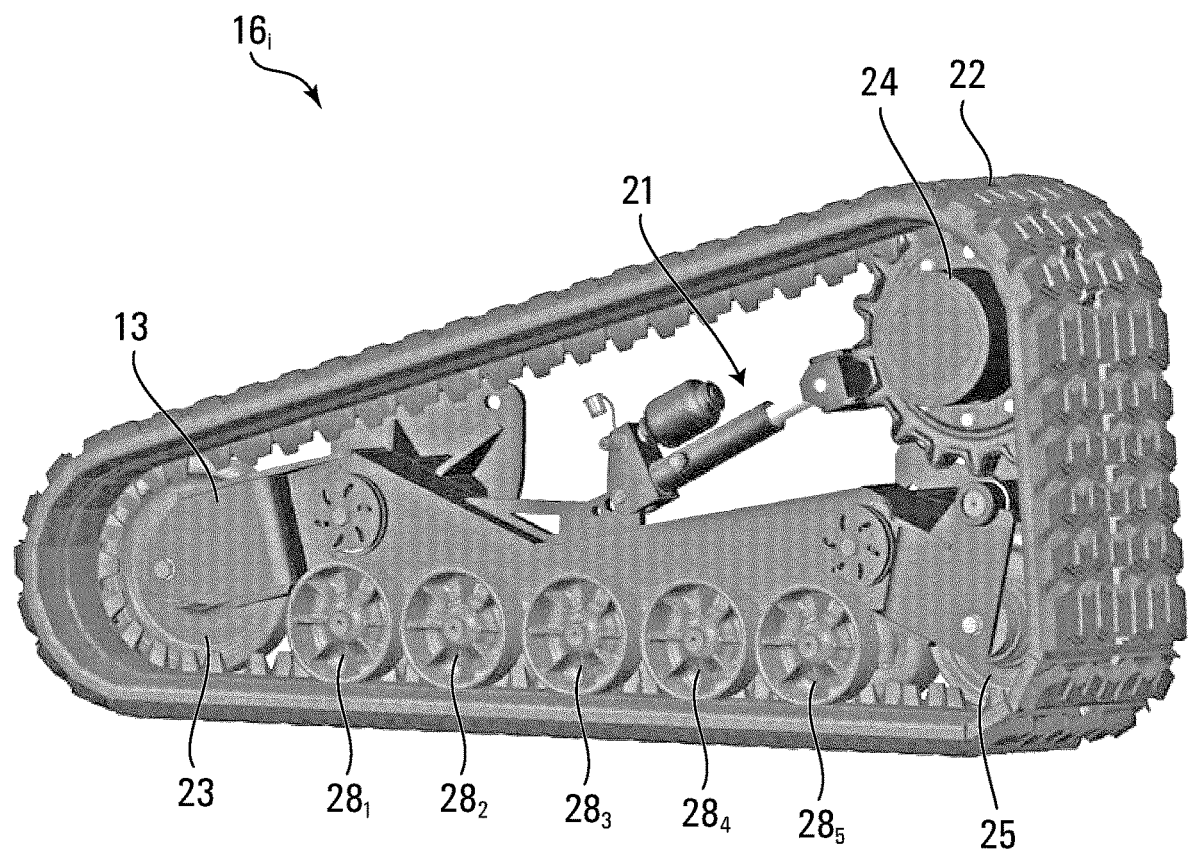
FIGS. 2 and 3 show a perspective view and a side view of a track system of the vehicle that includes the track.
Figure 3:
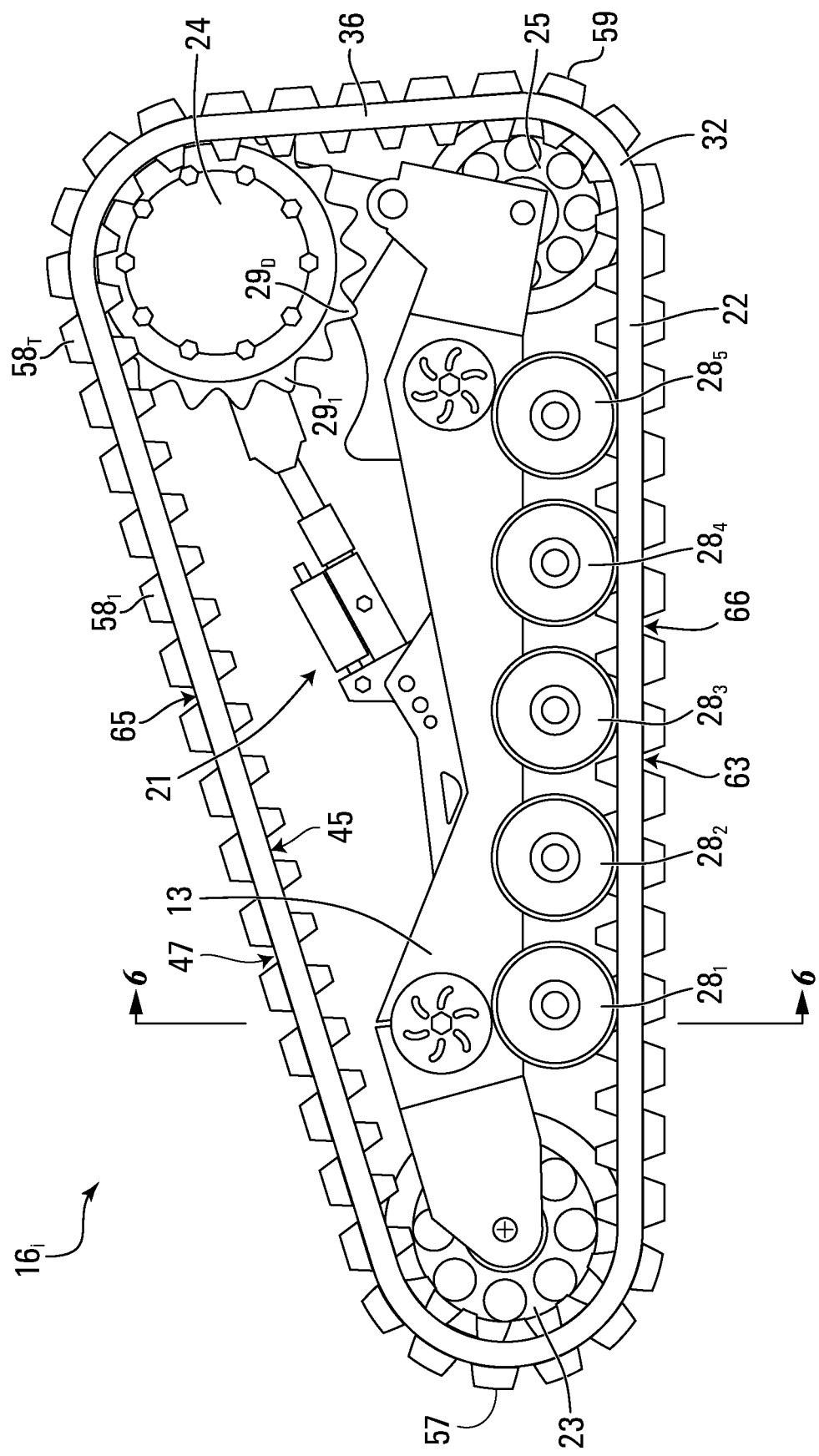

The track systems $16_1$, $16_2$ engage the ground to propel the vehicle 10. With additional reference to FIGS. 2 and 3, each track system $16_i$ comprises a track-engaging assembly 21 and the track 22 disposed around the track-engaging assembly 21. In this embodiment, the track-engaging assembly 21 comprises a plurality of wheels which, in this example, includes a drive wheel 24 and a plurality of idler wheels that includes a front (i.e., leading) idler wheel 23, a rear (i.e., trailing) idler wheel 25, and roller wheels $28_1$-$28_{10}$. The track system $16_i$ also comprises a frame 13 which supports various components of the track system $16_i$ including the wheels 24, 23, 25, $28_1$-$28_{10}$. In this embodiment, the vehicle 10 can be steered by operating the track systems $16_1$, $16_2$ differently, such as by moving their tracks 22 at different speeds and/or in different directions.

The track system $16_i$ has a longitudinal direction and a front longitudinal end 57 and a rear longitudinal end 59 that define a length of the track system $16_i$ along a longitudinal axis 61 that defines the longitudinal direction of the track system $16_i$. The track system $16_i$ has a widthwise direction and a width that is defined by a width $W_T$ of the track 22. The track system $16_i$ also has a heightwise direction that is normal to its longitudinal and widthwise directions.

Figure 4:
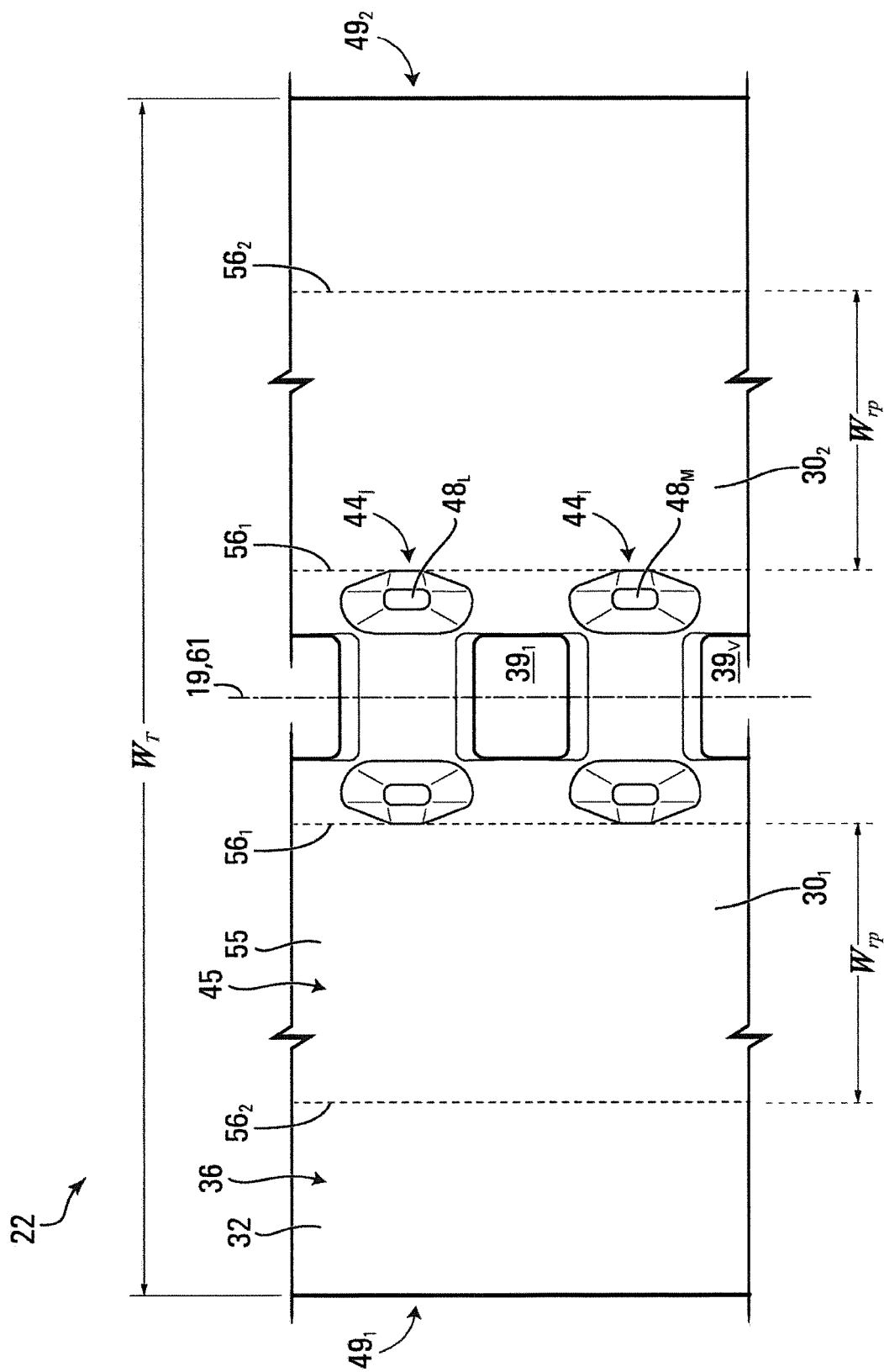
FIGS. 4 and 5 show an inner plan view and a cross-sectional view of the track.
Figure 5:
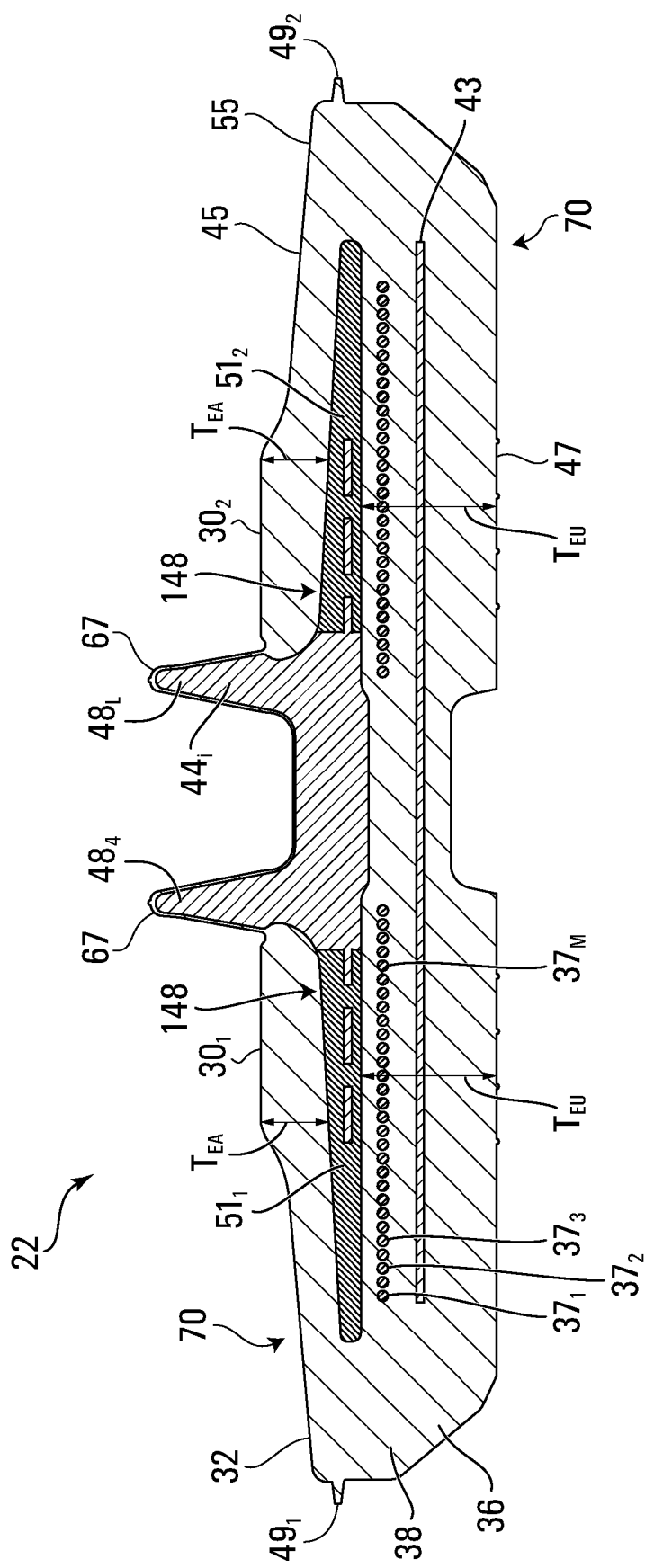
Figure 6:
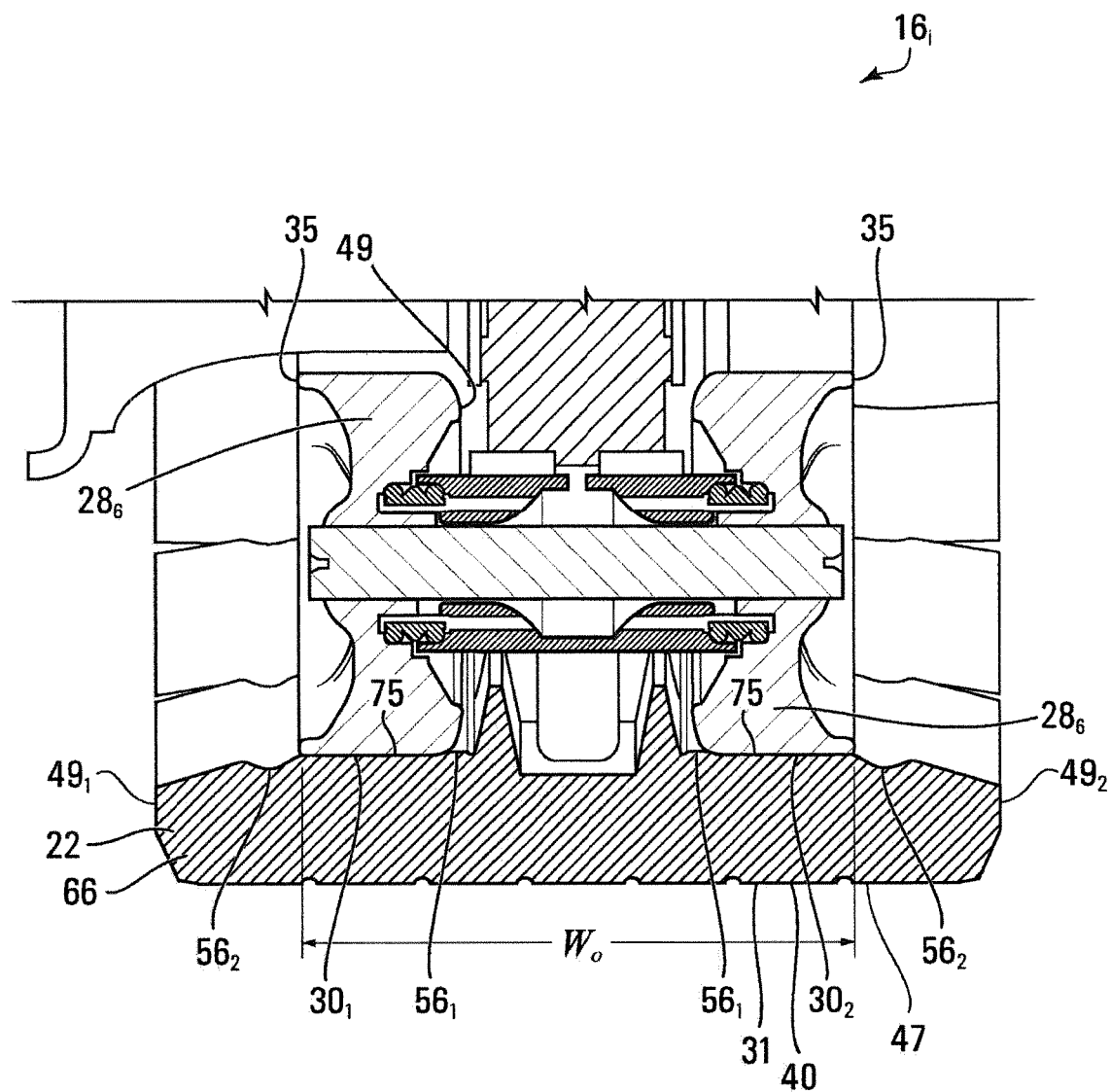
FIGS. 6 to 8 show examples of a wheel of the track system in relation to the track.
Figure 7:
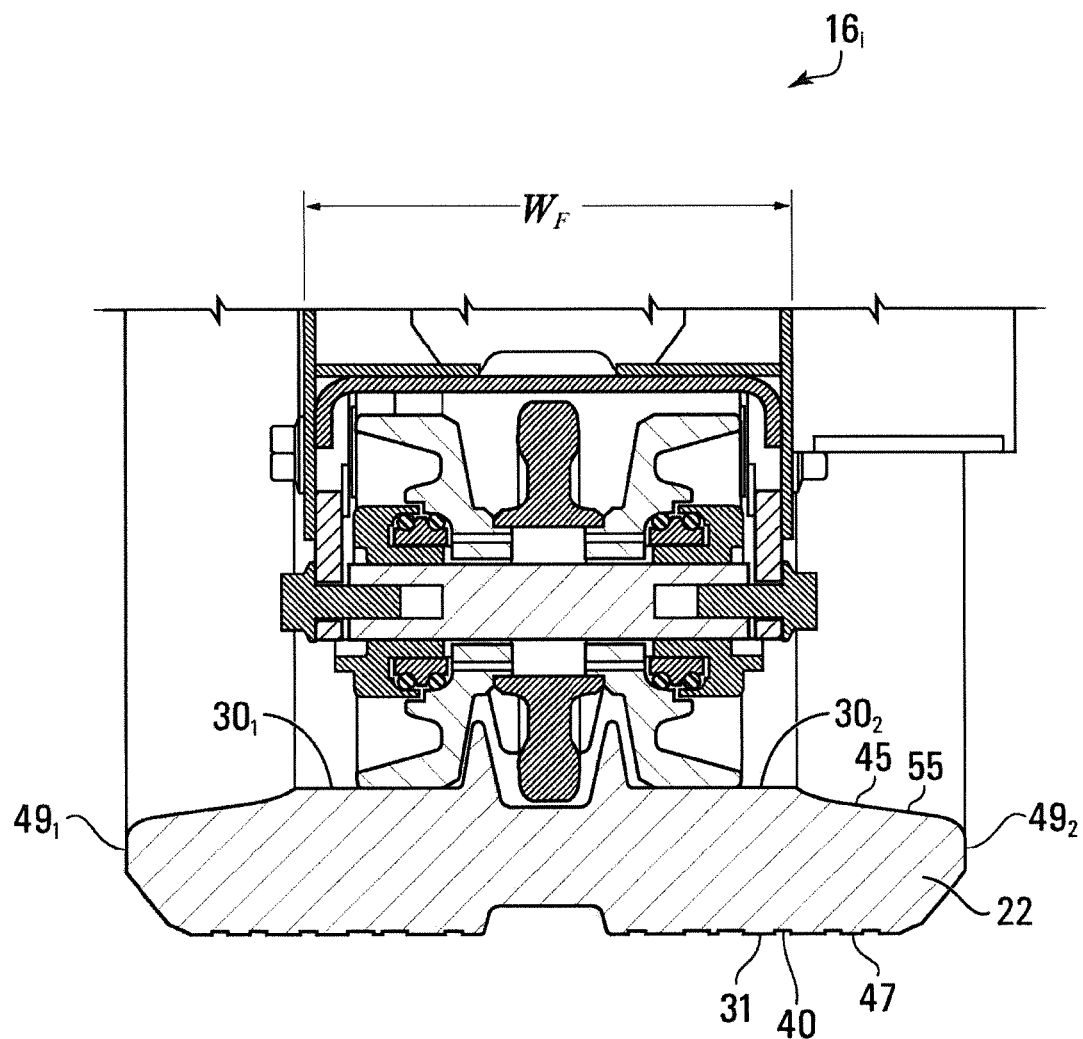
Figure 8:
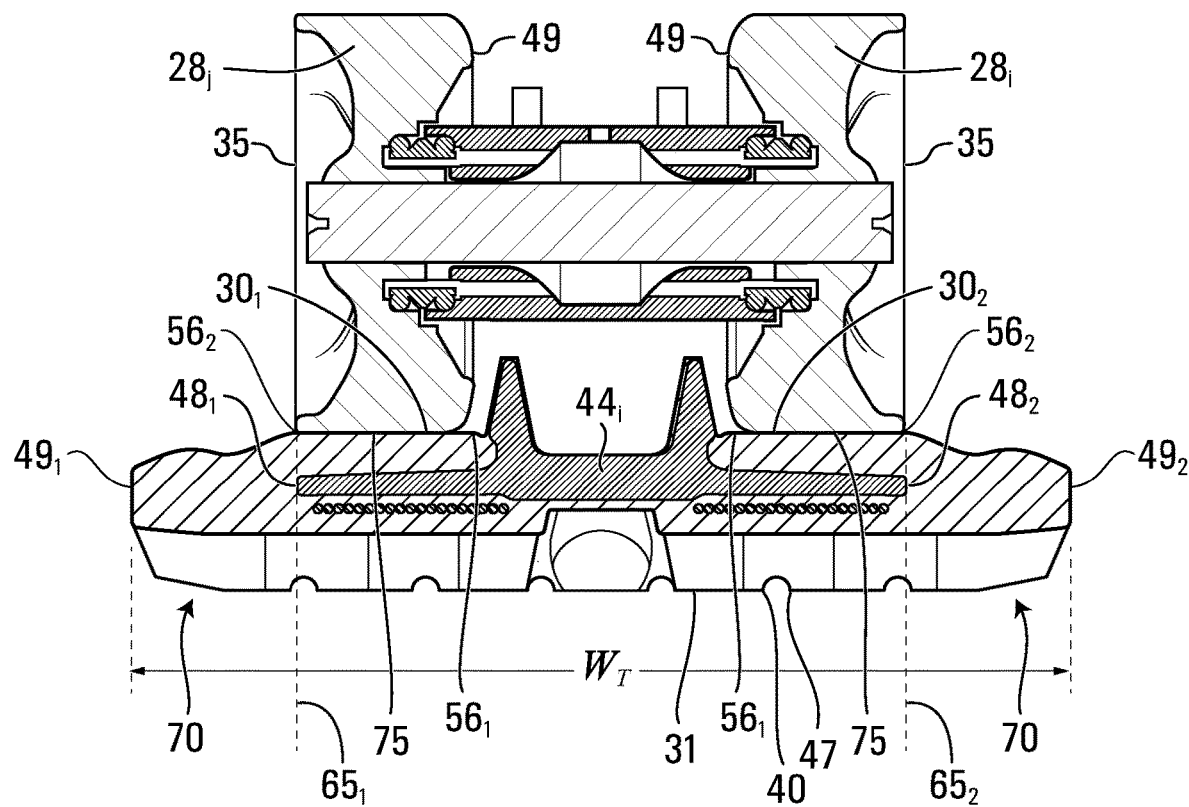
Figure 9:
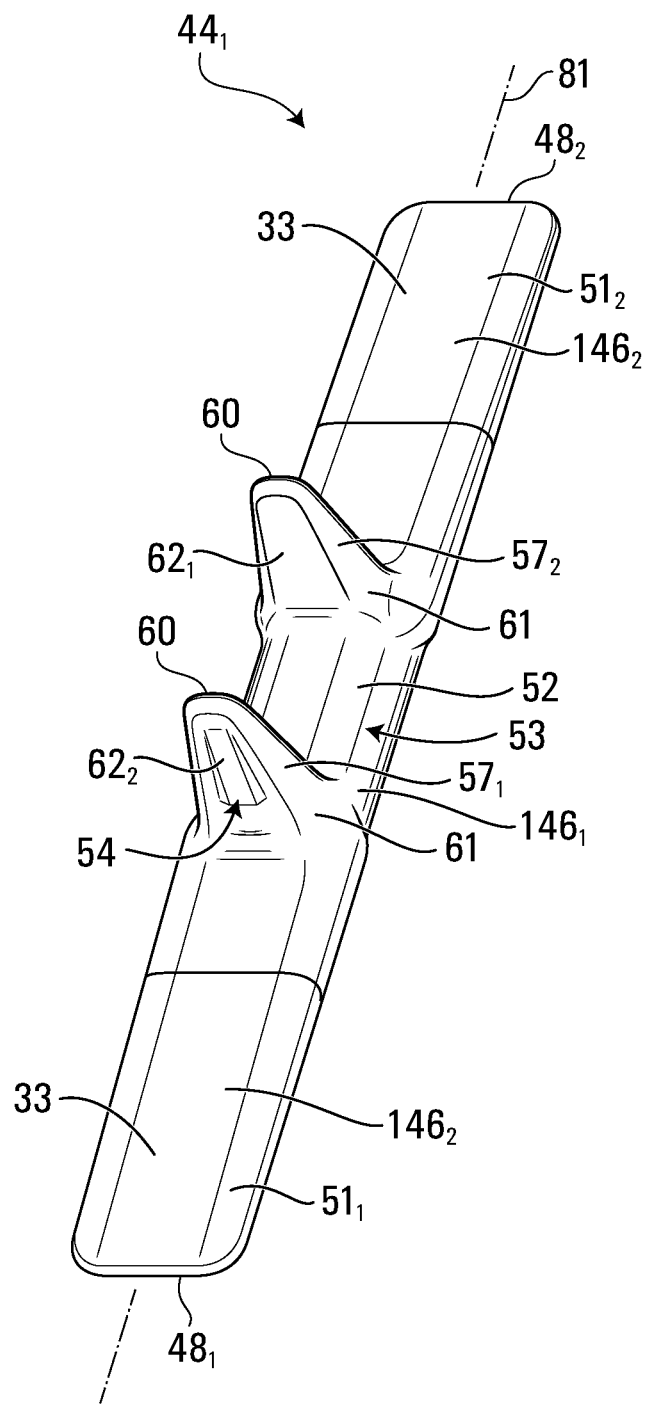
Figure 13:
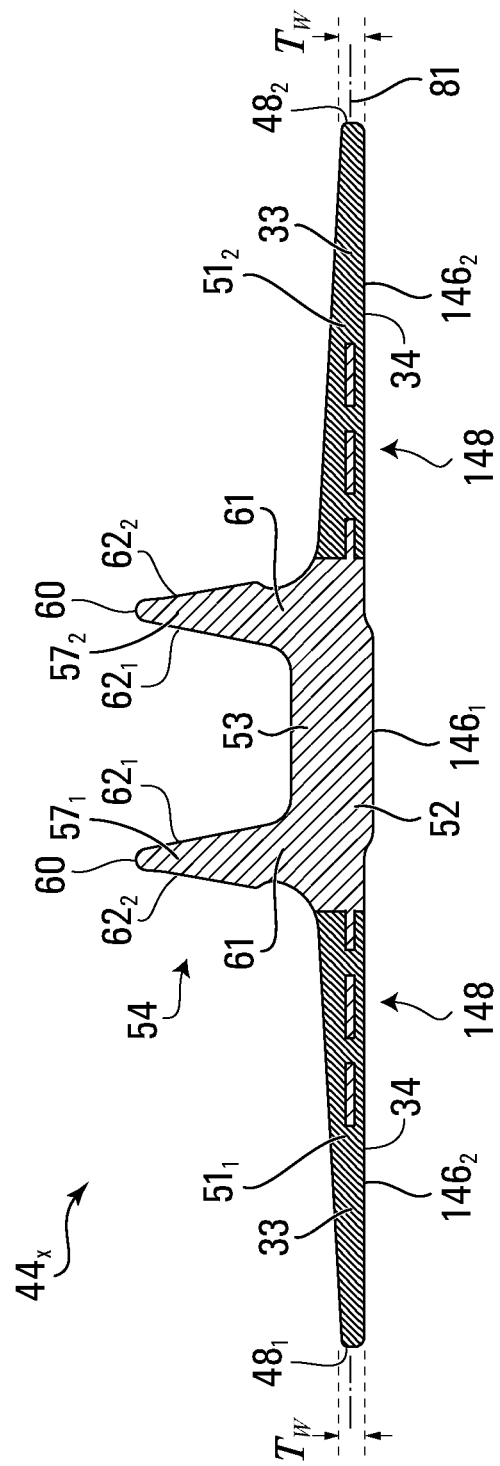
Figure 14:
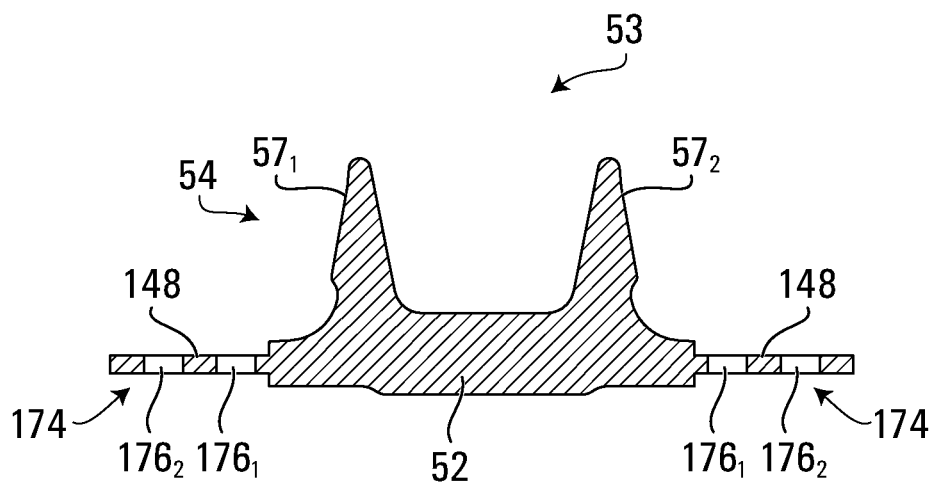
FIGS. 14 and 15 show a section of the core of FIGS. 9 to 13.
Figure 15:
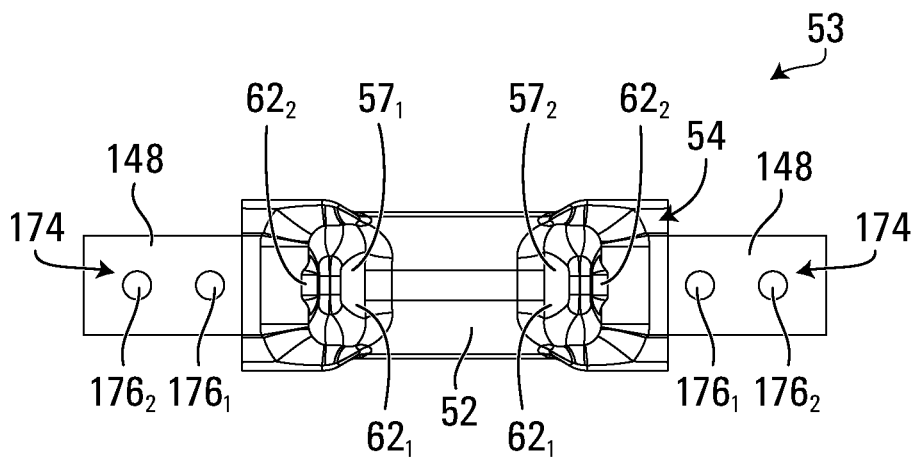

The track 22 engages the ground to provide traction to the vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 4 to 6, the track 22 comprises an inner side 45, a ground-engaging outer side 47, and lateral edges $49_1$, $49_2$. The inner side 45 faces the wheels 24, 23, 25, $28_1$-$28_{10}$, while the ground-engaging outer side 47 engages the ground. A top run 65 of the track 22 extends between the longitudinal ends 57, 59 of the track system $16_i$ and over the wheels 24, 23, 25, $28_1$-$28_{10}$, whereas a bottom run 66 of the track 22 extends between the longitudinal ends 57, 59 of the track system $16_i$ and under the wheels 24, 23, 25, $28_1$-$28_{10}$. The bottom run 66 of the track 22 defines an area of contact 63 of the track 22 with the ground which generates traction and bears a majority of a load on the track system $16_i$ and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thicknesswise direction normal to its longitudinal and widthwise directions.

The track 22 is elastomeric, i.e., comprises elastomeric material 32, to be flexible around the track-engaging assembly 21. The elastomeric material 32 of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material 32 of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the track 22 comprises internal reinforcements disposed in its elastomeric material 32, including the elastomeric material 38 of the carcass 36.

For instance, in this embodiment, a plurality of cores $44_1$-$44_N$ are disposed in the elastomeric material 38 of the carcass 36. The cores $44_1$-$44_N$, which may in some cases also be referred to as "inserts", are distributed along and extend transversally to the longitudinal direction of the track 22 to impart transverse rigidity to the track 22. The cores $44_1$-$44_N$ may also help to drive the track 22 by engagement with the drive wheel 24 and/or guide the track 22 by contacting the wheels 23, 25, $28_1$-$28_{10}$ as the track 22 is driven by the drive wheel 24.

In this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

Also, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the cores $44_1$-$44_N$, the reinforcing cables $37_1$-$37_M$, and the layer of reinforcing fabric 43.

The inner side 45 of the track 22 comprises an inner surface 55 of the carcass 36 and a plurality of wheel-contacting projections $48_1$-$48_N$ that project from the inner surface 55 and are positioned to contact respective ones of the wheels 23, 25, $28_1$-$28_{10}$ to do at least one of guiding the track 22 and driving (i.e., imparting motion to) the track 22. Since each of them is used to do at least one of guiding the track 22 and driving the track 22, the wheel-contacting projections $48_1$-$48_N$ can be referred to as "guide/drive projections". In this embodiment, each guide/drive projection $48_i$ interacts with respective ones of the idler wheels 23, 25, $28_1$-$28_{10}$ to guide the track 22 to maintain proper track alignment and prevent de-tracking without being used to drive the track 22, in which case the guide/drive projection $48_i$ is a guide projection. In other embodiments, a guide/drive projection $48_i$ may interact with the drive wheel 24 to drive the track 22, in which case the guide/drive projection $48_i$ is a drive projection. In yet other embodiments, a guide/drive projection $48_i$ may both (i) interact with the drive wheel 24 to drive the track and (ii) interact with respective ones of the idler wheels 23, 25, $28_1$-$28_{10}$ to guide the track 22 to maintain proper track alignment and prevent de-tracking, in which case the guide/drive projection $48_i$ is both a drive projection and a guide projection.

In this embodiment, each guide projection $48_i$ comprises elastomeric material 67 overlying a given one of the cores $44_1$-$44_N$. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide projection $48_i$. The elastomeric material 67 of the guide projection $48_i$ may be provided on the inner side 45 of the track 22 in various ways. For example, in this embodiment, the elastomeric material 67 of the guide projection $48_i$ is provided by being molded with the carcass 36.

The inner side 45 of the track 22 comprises rolling paths $30_1$, $30_2$ on which the roller wheels $28_1$-$28_{10}$ roll to apply the bottom run 66 of the track 22 onto the ground. For example, a peripheral surface 75 of each roller wheel $28_i$ between an outer lateral surface 35 and an inner lateral surface 49 of the roller wheel $28_i$ is in rolling contact with a given one of the rolling paths $30_1$, $30_2$ of the track 22. Each of the rolling paths $30_1$, $30_2$ of the track 22 comprises an inner lateral edge $56_1$ and an outer lateral edge $56_2$ that define a width $W_{rp}$ of that rolling path.

The ground-engaging outer side 47 of the track 22 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the track 22 and engaging the ground to enhance traction. The traction projections $58_1$-$58_T$ may be referred to as "tread projections" or "traction lugs". The traction lugs $58_1$-$58_T$ may have any suitable shape (e.g., curved shapes, shapes with straight parts and curved parts, etc.).

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer).

The traction lugs $58_1$-$58_T$ may be provided on the ground-engaging outer side 47 of the track 22 in various ways. For example, in this embodiment, the traction lugs $58_1$-$58_T$ are provided on the ground-engaging outer side 47 of the track 22 by being molded with the carcass 36.

The drive wheel 24 is rotatable by power derived from the powertrain 15 to drive the track 22. In this embodiment, the drive wheel 24 is a drive sprocket comprising a plurality of drive members $29_1$-$29_D$ spaced apart circumferentially to engage the drive portion 52 of each of the cores $44_1$-$44_N$ in order to drive the track 22 (e.g., a "positive drive" arrangement). In this example, the track 22 comprises drive voids $39_1$-$39_V$ (e.g., recesses or holes) to receive the drive members $29_1$-$29_D$ of the drive wheel 24.

The idler wheels 23, 25, $28_1$-$28_{10}$ are not driven by power supplied by the powertrain 15, but are rather used to do at least one of supporting part of a weight of the vehicle 10 on the ground via the track 22, guiding the track 22 as it is driven by the drive wheel 24, and tensioning the track 22. More particularly, in this embodiment, the front and rear idler wheel 23, 25 maintain the track 22 in tension and help to support part of the weight of the vehicle 10 on the ground via the track 22. The roller wheels $28_1$-$28_{10}$ roll on the rolling paths $30_1$, $30_2$ of the track 22 along the bottom run 66 of the track 22 to apply it onto the ground.

Each core $44_i$ is embedded in the elastomeric material 38 of the carcass 36 in that at least a substantial part of the core $44_i$ is disposed in the elastomeric material 38 of the carcass 36. In some cases, an entirety of the core $44_i$ may be covered by the elastomeric material 32 of the track 22 (e.g., when the track 22 is new). In other cases, a portion of the core $44_i$ may be exposed and uncovered by the elastomeric material 32 of the track 22 (e.g., when the track 22 has undergone wear during use).

With additional reference to FIGS. 9 to 15, the core $44_i$ has a longitudinal axis 81 extending transversally to the longitudinal axis 19 of the track 22 and defining a longitudinal direction of the core $44_i$. In this example, the longitudinal axis 81 of the core $44_i$ extends perpendicularly to the longitudinal axis 45 of the track 22, such that it is oriented in the widthwise direction of the track 22. In this embodiment, the core $44_i$ has a length which is shorter than the width of the track 22 such that it has longitudinal ends $48_1$, $48_2$ that are spaced apart from the lateral edges $49_1$, $49_2$ of the track 22. The core $44_i$ also has a widthwise direction and a thicknesswise direction that are normal to its longitudinal direction.

More particularly, in this embodiment, the core $44_i$ comprises a pair of wings $51_1$, $51_2$ (i.e., extensions) and a wheel engager 53 disposed between the wings $51_1$, $51_2$.

The wings $51_1$, $51_2$ are elongated along the longitudinal axis 81 of the core $44_i$ to impart transverse rigidity to the track 22. Each of the wings $51_1$, $51_2$ has an inner surface 33 oriented towards the inner side 45 of the track 22 and an outer surface 34 oriented towards the ground-engaging outer side 47 of the track 22. In this embodiment, each of the wings $51_1$, $51_2$ has a tapered shape whereby its inner surface 33 and its outer surface 34 converge towards one another toward a given one of the longitudinal ends $48_1$, $48_2$ of the core $44_i$. The wings $51_1$, $51_2$ may have any other shape in other embodiments.

The wheel engager 53 is configured to engage respective ones of the wheels 23, 25, $28_1$-$28_{10}$ as the track 22 is driven by the drive wheel 24. More particularly, in this embodiment, the wheel engager 53 comprises a drive portion 52 for engaging the drive wheel 24 to drive the track 22 and a wheel guide 54 that projects on the inner side 55 of the track 22 for contacting the roller wheels $28_1$-$28_{10}$ to help guide the track 22. In this example, the wheel guide 54 comprises a pair of guide projections $57_1$, $57_2$ that project on the inner side 55 of the track 22. Each guide projection $57_i$ comprises a top end 60, a base 61, and a pair of wheel-facing sides $62_1$, $62_2$ opposite one another and extending from its base 61 to its top end 60. The wheel engager 53 may be configured in various other ways in other embodiments (e.g., it may comprise only one guide projection or more than two (2) guide projections, etc.).

Figure 16:
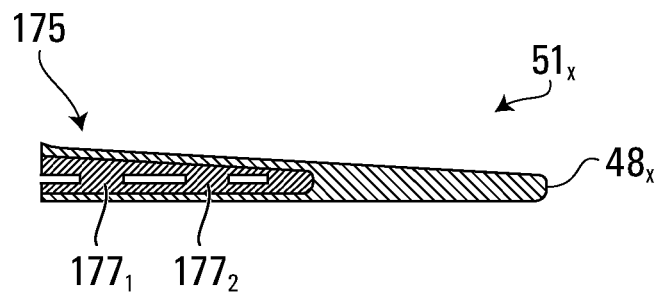
FIG. 16 shows another section of the core of FIGS. 9 to 13.
Figure 17:
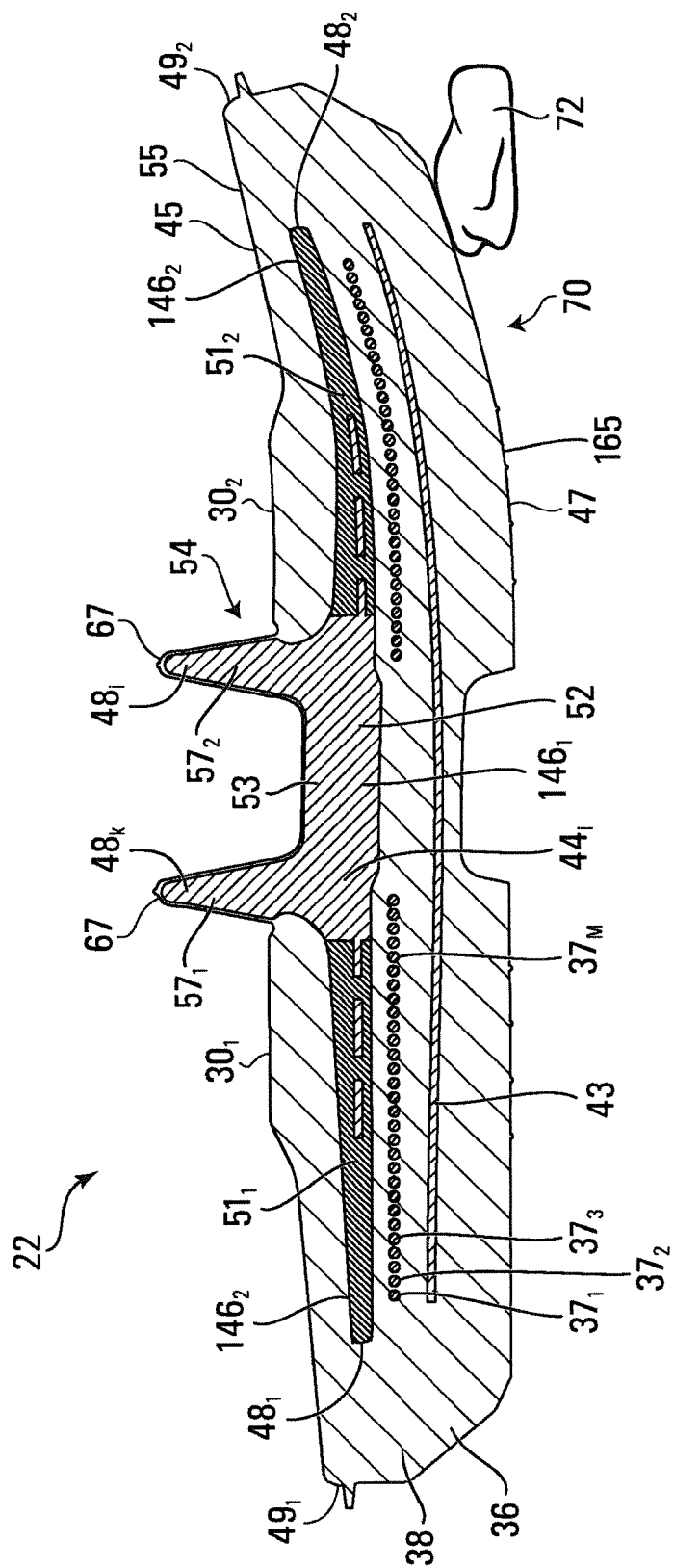
FIG. 17 shows a cross-sectional view of the track when encountering an obstacle, according to an embodiment.

In this embodiment, with additional reference to FIG. 16, the wings $51_1$, $51_2$ of the core $44_i$ are configured to flex in the longitudinal direction of the core $44_i$ to allow a given one of the wings $51_1$, $51_2$ to deflect in the thicknesswise direction of the track 22, such as, for example, when the track 22 encounters a curb or other object 72 on the ground. For instance, the given one of the wings $51_1$, $51_2$ may flex to deflect upwardly when a lateral part 70 of the track 22 contacts the curb or other object 72 on the ground. This may help to reduce stresses in the core $44_i$ and/or potential for edge-cutting of the elastomeric material 32 in the lateral part 70 of the track 22. This may also help to accommodate deformation such as upward deflection of the elastomeric material 38 of the carcass 36 between the core $44_i$ and an adjacent one of the cores $44_1$-$44_N$.

A longitudinal stiffness of a given one of the wings $51_1$, $51_2$ of the core $44_i$, i.e., a rigidity of the given one of the wings $51_1$, $51_2$ in the longitudinal direction of the core $44_i$ which refers to that wing's resistance to flexing (e.g., bending or otherwise deflecting) about an axis parallel to the widthwise direction of the core $44_i$ may thus be reduced to facilitate flexion of that wing. For example, in some embodiments, the longitudinal stiffness of the given one of the wings $51_1$, $51_2$ of the core $44_i$ may be no more than $10^7$ N/m, in some cases no more than $10^6$ N/m, in some cases no more than $10^5$ N/m, in some cases no more than $10^4$ N/m, and in some cases even less (e.g., 1000 N/m or lower).

Figure 18:
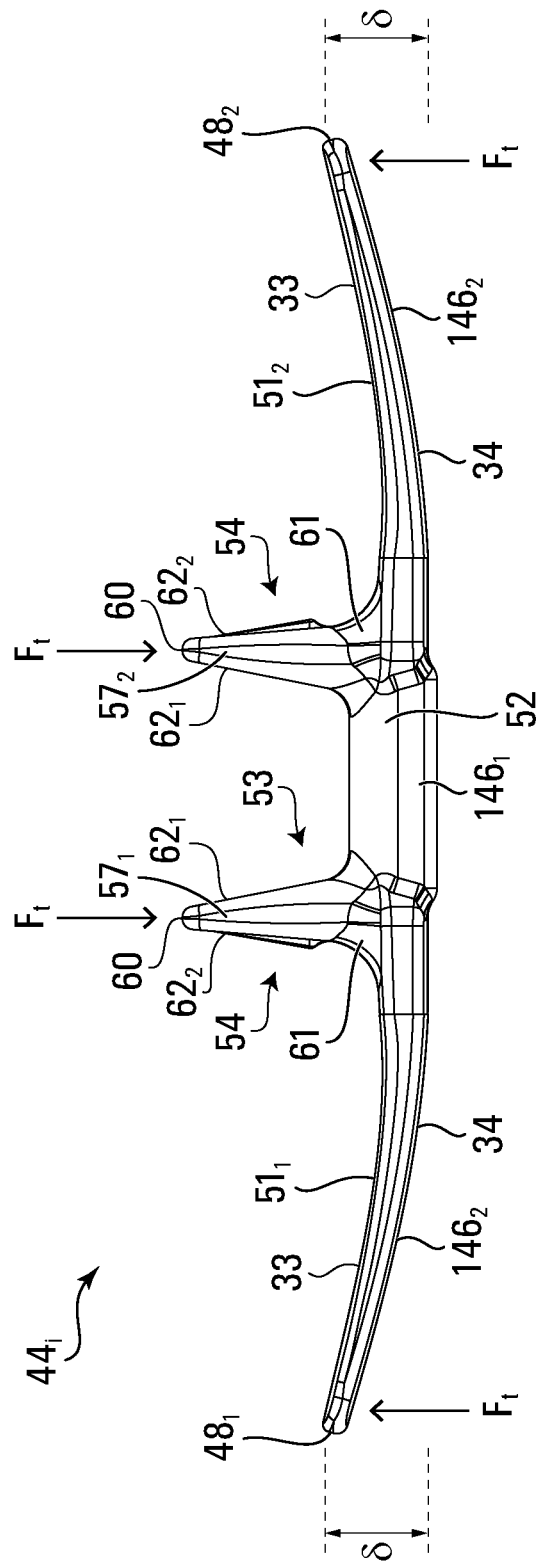
FIG. 18 shows the core of the track submitting to a bending test.

To observe the longitudinal stiffness of a given one of the wings $51_1$, $51_2$ of the core $44_i$ (without influence from a remainder of the track 22), a test can be performed to: (1) isolate the core $44_i$ from the remainder of the track 22 (e.g., by extracting the core $44_i$ from the track 22 or by producing the core $44_i$ without proving it in the track 22); and (2)

subject the core $44_i$ to a bending load $F_t$ tending to bend the given one of the wings $51_1$, $51_2$ upwardly such that a corresponding one of the longitudinal ends $48_1$, $48_2$ of the core $44_i$ moves upwardly relative to the wheel engager 53 of the core $44_i$ and measure a deflection $\delta_t$ of the given one of the wings $51_1$, $51_2$, which can be taken as a displacement of the corresponding one of the longitudinal ends $48_1$, $48_2$ of the core $44_i$ relative to the wheel engager 53 under the bending load $F_t$, as shown in FIG. 18. The longitudinal stiffness of the given one of the wings $51_1$, $51_2$ can be expressed as a ratio of the bending load $F_t$ over the deflection $\delta_t$ of the given one of the wings $51_1$, $51_2$.

In use, when the lateral part 70 of the track 22 encounters the curb or other object 72 on the ground, under a design load F on the track 22, the given one of the wings $51_1$, $51_2$ can thus flex by a deflection $\delta$, which can be taken as a displacement of the corresponding one of the longitudinal ends $48_1$, $48_2$ of the core $44_i$ relative to the wheel engager 53 under the design load F. For example, in some embodiments, the deflection $\delta$ may be at least 10 mm when the design load is at least 1 kN, in some cases at least 10 mm when the design load is at least 5 kN, and in some cases at least 10 mm when the design load is at least 20 kN.

In this embodiment, a material composition of the core $44_i$ is designed for flexion of the wings $51_1$, $51_2$ in the longitudinal direction of the core $44_i$.

More particularly, in this embodiment, the core $44_i$ includes a plurality of materials $146_1$, $146_2$ that are different and enable flexion of the wings $51_1$, $51_2$ in the longitudinal direction of the core $44_i$. The wheel engager 53 is at least mainly (i.e., mainly or entirely) made of the material $146_1$, while each of the wings $51_1$, $51_2$ is at least mainly made of the material $146_2$ which is less stiff than the material $146_1$ such that the wings $51_1$, $51_2$ can flex relative to the wheel engager 53.

For example, in some embodiments, a ratio of a modulus of elasticity (i.e., Young's modulus) of the material $146_2$ of the wings $51_1$, $51_2$ of the core $44_i$ over a modulus of elasticity of the material $146_1$ of the wheel engager 53 of the core $44_i$ may be no more than 0.9, in some cases no more than 0.7, in some cases no more than 0.5, and in some cases even less (e.g., 0.3 or lower).

As another example, in some embodiments, a ratio of an elongation at break of the material $146_2$ of the wings $51_1$, $51_2$ of the core $44_i$ over an elongation at break of the material $146_1$ of the wheel engager 53 of the core $44_i$ may be at least 1.1, in some cases at least 1.5, in some cases at least 2, in some cases at least 5, in some cases at least 10, in some cases event more (e.g., 20 or higher).

For example, in this embodiment, the materials $146_1$, $146_2$ are metallic materials. The material $146_1$ of the wheel engager 53 is carbon steel formed into shape by casting. The material $146_2$ of the wings $51_1$, $51_2$ is spring steel formed into shape by casting. The core $44_1$ may be made using various other processes (e.g., extruding, forging, welding, fastening, etc.) in other embodiments.

The wheel engager 53 and the wings $51_1$, $51_2$ are secured to one another. In this embodiment, the wheel engager 53 and each of the wings $51_1$, $51_2$ are mechanically interlocked at an interface 148 of the wheel engager 53. That is, at each interface 148, the wheel engager 53 and a given one of the wings $51_1$, $51_2$ are in a mechanical interlock in which they are interconnected via a given one of the wheel engager 53 and the given one of the wings $51_1$, $51_2$ extending into the other one of the wheel engager 53 and the given one of the wings $51_1$, $51_2$. To that end, a given one of the metallic wheel engager 53 and the given one of the wings $51_1$, $51_2$ comprises an interlocking hollow space into which extends an interlocking part of the other one of the wheel engager 53 and the given one of the wings $51_1$, $51_2$. The interlocking hollow space may comprise one or more holes, one or more recesses, and/or one or more other hollow areas.

More particularly, in this embodiment, at each interface 148 of the wheel engager 53, the wheel engager 53 comprises an interlocking hollow space 174 into which extends an interlocking part 175 of the given one of the wings $51_1$, $51_2$. In this example, the interlocking hollow space 174 comprises a plurality of holes $176_1$, $176_2$. The interlocking part 175 of the given one of the wings $51_1$, $51_2$ occupies the holes $176_1$, $176_2$ of the interface 148 of the wheel engager 53. More specifically, the interlocking part 175 of the given one of the wings $51_1$, $51_2$ comprises a plurality of hole-occupying areas $177_1$, $177_2$ which occupy respective ones of the holes $176_1$, $176_2$ of the interface 148 of the wheel engager 53.

The mechanical interlock is created during manufacturing of the transversal core $44_x$. In this embodiment, the mechanical interlock is created by overmolding the wings $51_1$, $51_2$ onto the wheel engager 53 such that the wings $51_1$, $51_2$ are overmolded members. During overmolding of the wings $51_1$, $51_2$, the spring steel $146_2$ of the wings $51_1$, $51_2$ flows into the holes $176_1$, $176_2$ of the interfaces 148 of the wheel engager 53 where it is captured so as to create the mechanical interlock.

In this embodiment, the mechanical interlock implemented by the wheel engager 53 and the wings $51_1$, $51_2$ is such that they are interconnected without requiring a chemical bond between the wheel engager 53 and the wings $51_1$, $51_2$ and without requiring an adhesive bond between the wheel engager 53 and the wings $51_1$, $51_2$. Indeed, in this embodiment, there is no chemical bond and no adhesive bond between the wheel engager 53 and the wings $51_1$, $51_2$.

This interconnection of the wheel engager 53 and the wings $51_1$, $51_2$ without requiring an adhesive nor a chemical bond between them allows more freedom in selecting the material $146_1$ of the wheel engager 53 and the material $146_2$ of the wings $51_1$, $51_2$. For example, in some embodiments, the material $146_1$ of the wheel engager 53 and the material $146_2$ of the wings $51_1$, $51_2$ may be incompatible such that they are not chemically bonded when the material $146_2$ of the wings $51_1$, $51_2$ is overmolded on the wheel engager 53. As another example, in some embodiments, the material $146_1$ of the wheel engager 53 and the material $146_2$ of the wings $51_1$, $51_2$ may be incapable of being adhesively bonded by an adhesive.

In other embodiments the material $146_1$ of the wheel engager 53 and the material $146_2$ of the wings $51_1$, $51_2$ may be compatible such that they can be bonded by a chemical bond when the material $146_2$ of the wings $51_1$, $51_2$ is molded on the wheel engager 53 and/or may be capable of being bonded by an adhesive such that there may be a chemical bond and/or an adhesive between the wheel engager 53 and the wings $51_1$, $51_2$ in addition to the mechanical interlock.

The mechanical interlock between the wheel engager 53 and the wings $51_1$, $51_2$ may be implemented in any other suitable way in other embodiments. For example, in some embodiments, at each interface 148 of the wheel engager 53, the wheel engager 53 may comprise a plurality of recesses into which extends a plurality of recess-occupying areas of a respective one of the wings $51_1$, $51_2$. As another example, in some embodiments, at each interface 148 of the wheel engager 53, the wheel engager 53 may comprises a plurality of protrusions which extend into a plurality of holes of a respective one of the wings $51_1$, $51_2$.

The wings $51_1$, $51_2$ and the wheel engager 53 may be interconnected in any other suitable way in other embodiments. For example, in some embodiments, instead of being mechanically interlocked, the wings $51_1$, $51_2$ and the wheel engager 53 may be bonded to one another by a chemical bond and/or an adhesive. As another example, in other embodiments, the wings $51_1$, $51_2$ and the wheel engager 53 may be fastened using mechanical fasteners (e.g., bolts, screws, etc.). As yet another example, in other embodiments, the wings $51_1$, $51_2$ and the wheel engager 53 may be secured to one another by welding. As yet another example, in other embodiments, the wings $51_1$, $51_2$ may be fastened to the wheel engager 53 by being crimped onto the wheel engager 53. As yet another example, in other embodiments, the wings $51_1$, $51_2$ and the wheel engager 53 of a transversal core $44_x$ may be fastened to one another through a combination of two or more fastening methods, such as welding, crimping, a mechanical fastener, an adhesive, etc.

In the present embodiment, spring steel $146_2$ allows wings to flex when encountering an obstacle or a curb on the ground, while steel $146_1$ allows support of the wings and power transmission from the track assembly to the track. More particularly, the track 22 has a ground contact area 165 at the cross section of the core. When encountering an obstacle on the ground, the core flexes, allowing the ground contact area 165 to be minimally reduced.

Allowing the wings $51_1$, $51_2$ to flex, as spring steel $146_2$ does, reduces stress concentration in the wings $51_1$, $51_2$ and in the surrounding elastomeric material 38. This increases: i) a resistance to wear and fatigue of the wings $51_1$, $51_2$, thus allowing to reduce a thickness $T_w$ of the wings $51_1$, $51_2$ and/or to reduce mechanical requirement of the material $146_2$ composing the wings $51_1$, $51_2$ and/or to lighten the track 22 and/or increase a maximum speed of the track 22 and/or increase performances of the track 22; ii) a resistance to wear and edge cutting of the track 22, thus allowing to reduce dimensions of the track 22 and/or to reduce mechanical requirement of the elastomeric material 38 of the carcass 36 and/or to lighten the track and/or to increase a maximum speed of the track 22 and/or to increase performances of the track 22; and iii) a resistance to failure of the wheel engager 53, thus allowing to reduce dimensions of the wheel engager 53 and/or to reduce mechanical requirement of the material $146_1$ composing the wheel engager 53 and/or to lighten the track 22 and/or to increase a maximum speed of the track 22 and/or to increase performances of the track 22. In addition, this may allow the track 22 to absorb energy and/or to act like a suspension, thus preserving parts of the track assembly 21.

For instance, in some embodiments, the thickness $T_w$ of each of the wings $51_1$, $51_2$ of the core $44_i$ in the thicknesswise direction of the track 22 may be reduced.

As an example, in some embodiments, a ratio of the thickness $T_w$ of each of the wings $51_1$, $51_2$ of the core $44_i$ over a thickness of carcass 36 (measured from the inner surface 55 to the ground-engaging outer surface 31 of the carcass 36) may be no more than 0.8, in some cases no more than 0.6, in some cases no more than 0.4, in some cases even less.

As another example, in some embodiments, a ratio of the thickness $T_w$ of each of the wings $51_1$, $51_2$ over a height $H_{we}$ of the wheel engager 53 of the core $44_i$ may be no more than 0.8, in some cases no more than 0.6, in some cases no more than 0.4, in some cases even less.

As yet another example, in some embodiments, an aspect ratio of a given one of the wings $51_1$, $51_2$, which refers to a ratio of a width $W_w$ of the given one of the wings $51_1$, $51_2$ over the thickness $T_w$ of the given of the wings $51_1$, $51_2$ at a cross-section of the given one of the wings $51_1$, $51_2$, may be increased. For instance, in some embodiments, the aspect ratio of the given one of the wings $51_1$, $51_2$ may be at least 5, in some cases at least 10, in some cases at least 15, in some cases at least 20, in some cases even more.

In some embodiments, there may be less of the elastomeric material 38 of the carcass 36 around a given one of the wings $51_1$, $51_2$ of the core $44_i$. For example, in some embodiments, a thickness $T_{ea}$ of the elastomeric material 38 above the given one of the wings $51_1$, $51_2$ (i.e., from that wing's inner surface 33 to the inner surface 55 of the carcass 36) and/or a thickness $T_{eu}$ of the elastomeric material 38 below the given one of the wings $51_1$, $51_2$ (i.e., from that wing's outer surface 34 to the ground-engaging outer surface 31 of the carcass 36) may be reduced. For instance, in some embodiments, a ratio of the thickness $T_{ea}$ of the elastomeric material 38 above the given one of the wings $51_1$, $51_2$ over the thickness $T_w$ of the given one of the wings $51_1$, $51_2$ may be no more than 1, in some cases no more than 0.8, in some cases no more than 0.6, in some cases no more than 0.4, in some cases even less, and/or a ratio of the thickness $T_{eu}$ of the elastomeric material 38 below the given one of the wings $51_1$, $51_2$ over the thickness $T_w$ of the given one of the wings $51_1$, $51_2$ may be no more than 1, in some cases no more than 0.8, in some cases no more than 0.6, in some cases no more than 0.4, in some cases even less.

The track, including the cores $44_1$-$44_N$, may be implemented in various other ways in other embodiments.

In another embodiment, one or more of the materials $146_1$, $146_2$ of each core $44_i$ of the track 22 may be nonmetallic. For instance, the material $146_1$ is steel, and the material $146_2$ is a composite material. More particularly, the steel $146_1$ is carbon steel and the material $146_2$ is carbon composite.

The carbon composite $146_2$ allows the wings $51_1$, $51_2$ to flex when encountering an obstacle 72 on the ground, while the carbon steel $146_1$ allows support of the wings $51_1$, $51_2$ and power transmission from the track assembly 21 to the track 22. When encountering an obstacle 72 on the ground, the core $44_x$ flexes, allowing the ground contact area 165 to be minimally reduced.

Allowing the wings to flex as carbon composite $146_2$ does may have similar advantages as recited above with regards to spring steel.

In other embodiments, there may be more than two different materials like materials $146_1$, $146_2$ in the core $44_i$ such as three, four or even more different materials. For instance, in some embodiments, a transversal core $44_x$ may comprise a metallic core portion made of one or more metals and two or more polymeric core portions made of one or more different polymers. As another example, in some embodiments, a transversal core $44_x$ may comprise a portion made of a first metallic material (e.g., steel) and another portion made of a second, different metallic material (e.g., aluminum), may comprise a portion made of a first polymeric material and another portion made of a second, different polymeric material (e.g., stronger than the first polymeric material).

Figure 19:
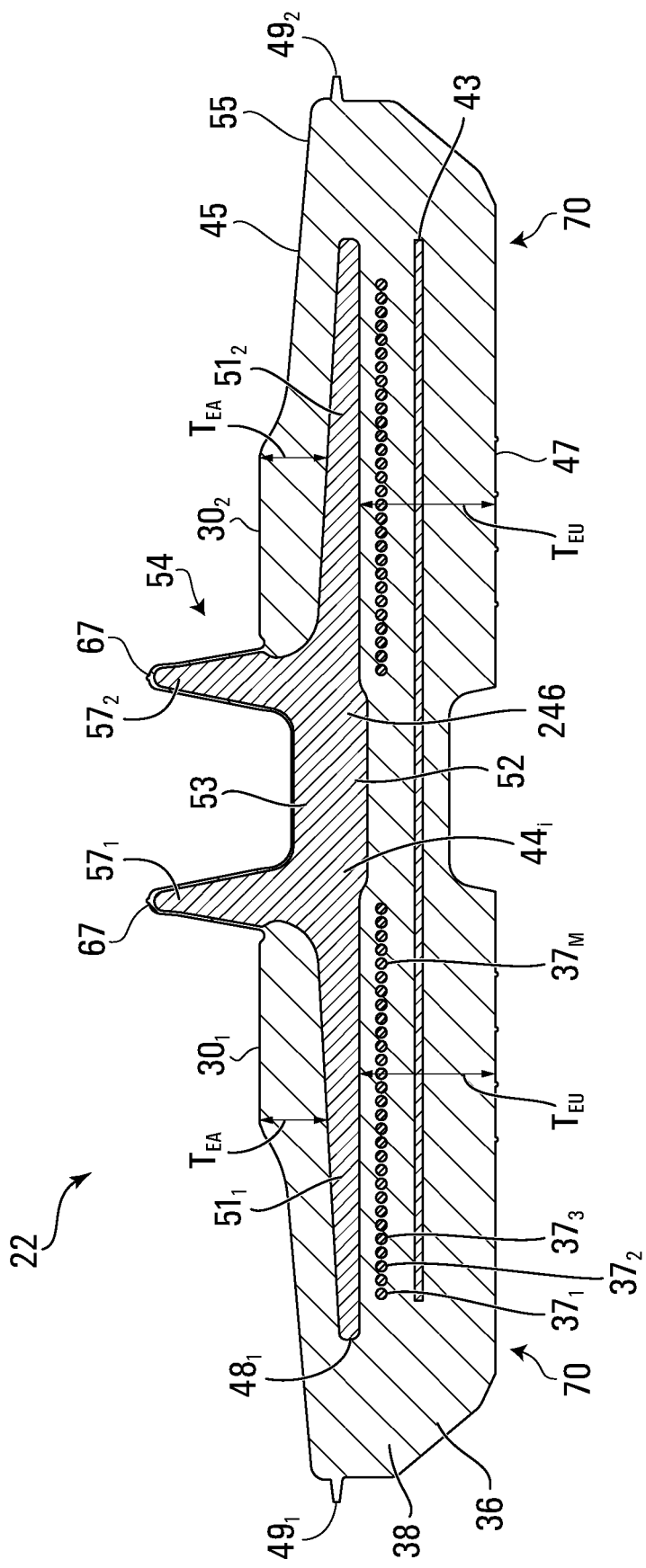
FIG. 19 shows a cross-sectional view of a track according to another embodiment.
Figure 20:
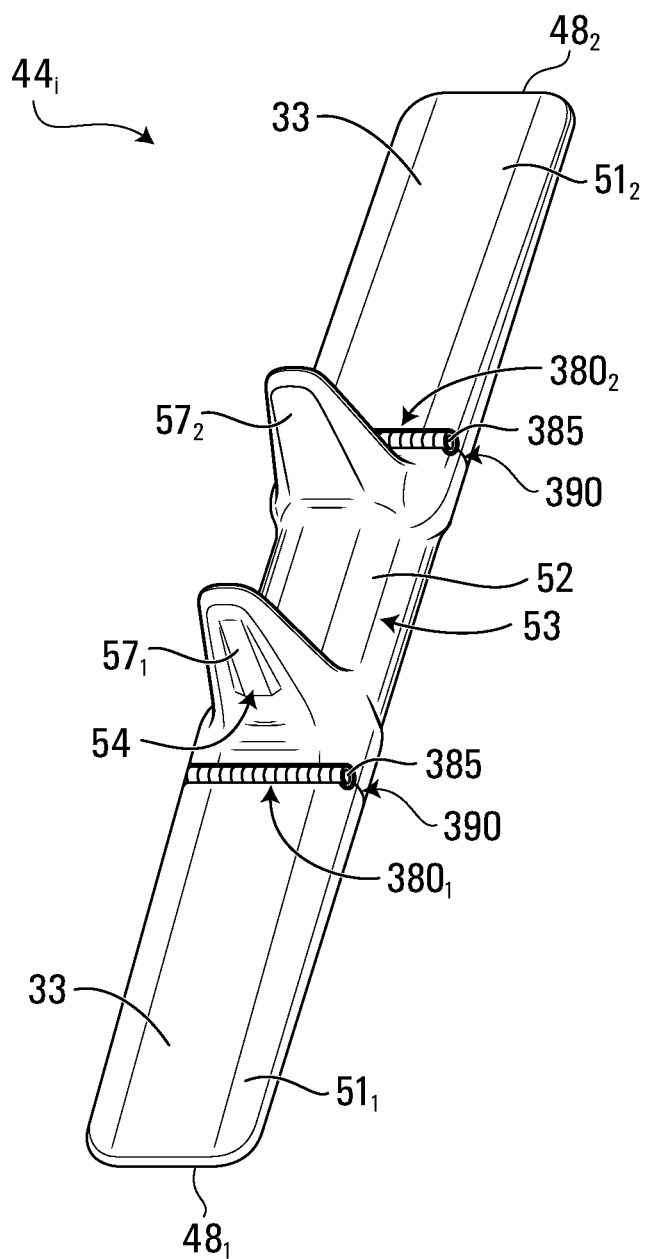
FIG. 20 shows a perspective view of a core of a track according to yet another embodiment.
Figure 21:
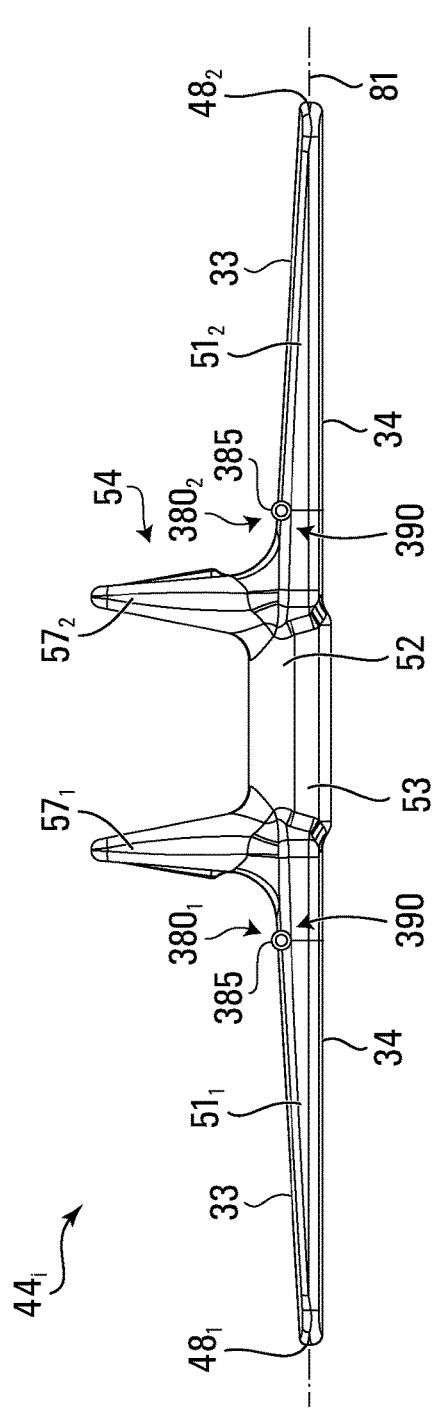
FIGS. 21 and 22 show the core in a locked state and in an unlocked state.
Figure 22:
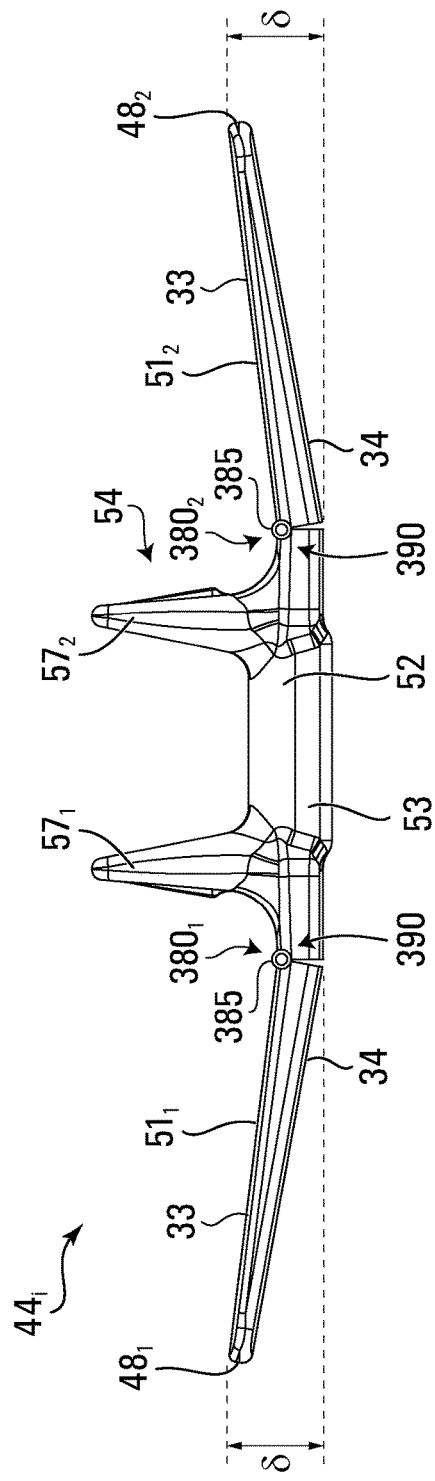
Figure 23:
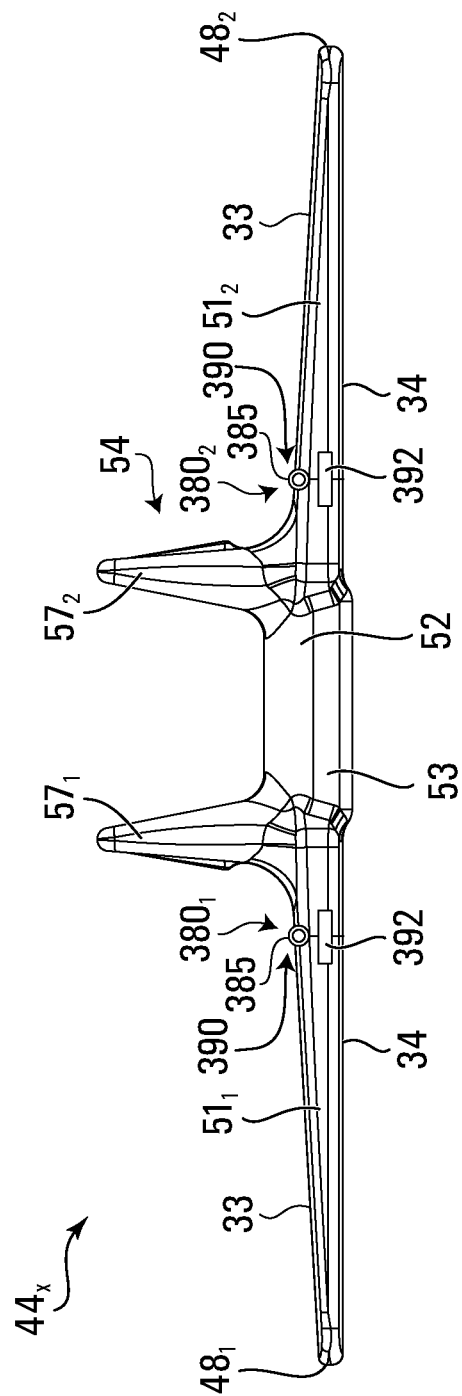
FIGS. 23 to 25 show a core according to another embodiment.

As another example, in some embodiments, with additional reference to FIG. 19, each core $44_i$ of the track 22 may include a material 246 that is flexible and makes up at least most (i.e., most or all) of its wheel engager 53 and each of its wings $51_1$, $51_2$.

For instance, in some embodiments, a modulus of elasticity of the material 246 of the core $44_i$ may be no more than 250 GPa, in some cases no more than 200 GPa, in some cases no more than 100 GPa, in some cases no more than 25 GPa, and in some cases even less (e.g., 1 GPa or lower).

In other embodiments, an elongation at break of the material 246 of the core $44_i$ may be at least 15%, in some cases at least 20%, in some cases at least 50%, in some cases at least 75%, and in some cases even more (e.g., 100% or higher).

In others embodiments, the flexible material 246 is anisotropic and mechanical properties of the flexible material 246, such as rigidity and elongation at break, in the longitudinal direction and in the widthwise direction of each core $44_i$ is different. In particular, the flexible material 246 may have a modulus of elasticity in the longitudinal direction of the core $44_i$ which is lower than a modulus of elasticity in the widthwise direction of the core $44_i$, and a ratio of the moduli of elasticity in the longitudinal direction and in the widthwise direction of each core $44_i$ may be no more than 0.9, in some cases no more than 0.7, in some cases even less (e.g. 0.5 or less). The flexible material 246 may also have an elongation at break in the longitudinal direction of the core $44_i$ which is greater than an elongation at break in the widthwise direction of the core $44_i$ and a ratio of the elongations at break in the longitudinal direction and in the widthwise direction of each core $44_1$ may be at least 1.1, in some cases at least 1.5, in some cases at least 2, in some cases even more (e.g. 3 or more).

More particularly, in a first variant, the material 246 is spring steel formed into shape by casting. The core $44_i$ may be made using various other processes (e.g., forging, welding, fastening, etc.) in other embodiments. Mechanical properties of spring steel $146_2$ allow the wings $51_1$, $51_2$ to flex when encountering an obstacle or a curb on the ground, while spring steel $146_2$ is resistant enough to support the wings $51_1$, $51_2$ and to transmit power from the track assembly 21 to the track 22.

In some embodiments, each core $44_i$ of the track 22 may have a variable stiffness structure such that the longitudinal stiffness of a given one of the wings $51_1$, $51_2$ of the core $44_i$ is variable during use of the track 22. For example, the longitudinal stiffness of the given one of the wings $51_1$, $51_2$ may decrease in response to the lateral part 70 of the track 22 contacting the curb or other object 72 on the ground to allow flexion of the given one of the wings $51_1$, $51_2$. Thus, the given one of the wings $51_1$, $51_2$ may normally be rigid to provide transversal rigidity and become more flexible when the lateral part 70 of the track 22 contacts the curb or other object 72.

For example, in some embodiments, as shown in FIGS. 20 to 23, the core $44_i$ may comprise movable mechanical joints $380_1$, $380_2$ that are respectively associated with the wings $51_1$, $51_2$ such that a respective one of the movable mechanical joints $380_1$, $380_2$ is movable to allow flexion of the given one of the wings $51_1$, $51_2$ in response to the lateral part 70 of track 22 contacting the curb or other object 72 on the ground. The respective one of the movable mechanical joints $380_1$, $380_2$ which will be denoted $380_x$, is configured to permit the given one of the wings $51_1$, $51_2$, which will be denoted $51_x$, to deflect upwardly relative to the wheel engager 53 upon the lateral part 70 of track 22 contacting the curb or other object 72 on the ground.

In this embodiment, the movable mechanical joint $380_x$ comprises a pivot 385 to allow the wing $51_x$ to pivot relative to the wheel engager 53 when the lateral part 70 of track 22 contacts the curb or other object 72 on the ground. In other embodiments, the movable mechanical joint $380_x$ may comprise any other suitable mechanical connection that allows parts of the core $44_i$ to move relative to one another to permit the wing $51_x$ to deflect upwardly relative to the wheel engager 53 when the lateral part 70 of track 22 contacts the curb or other object 72 on the ground.

The movable mechanical joint $380_x$ may change between a locked state, in which it prevents the wing $51_x$ from flexing (e.g., by pivoting) relative to the wheel engager 53 when the lateral part 70 of track 22 has not contacted the curb or other object 72 on the ground, and an unlocked state, in which it allows the wing $51_x$ to flex (e.g., by pivoting) relative to the wheel engager 53 when the lateral part 70 of track 22 contacts the curb or other object 72 on the ground. The movable mechanical joint $380_x$ is unlocked, i.e., changes from its locked state to its unlocked state, in response to the lateral part 70 of track 22 contacting the curb or other object 72 on the ground. To that end, the movable mechanical joint $380_x$ may comprise a locking mechanism 390 to unlock and lock itself.

Figure 24:
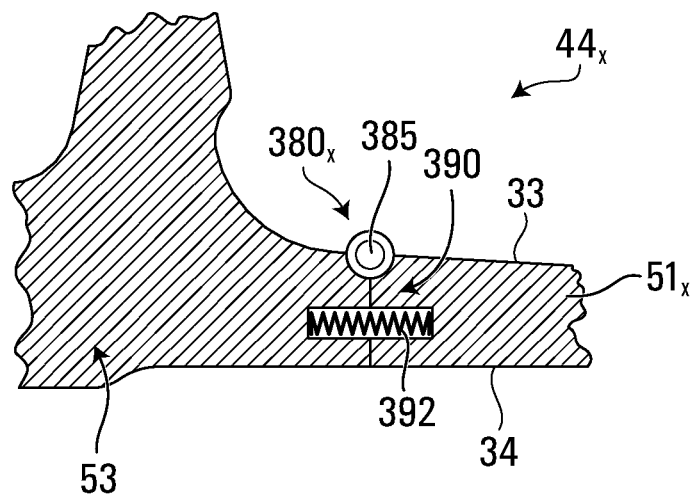
Figure 25:
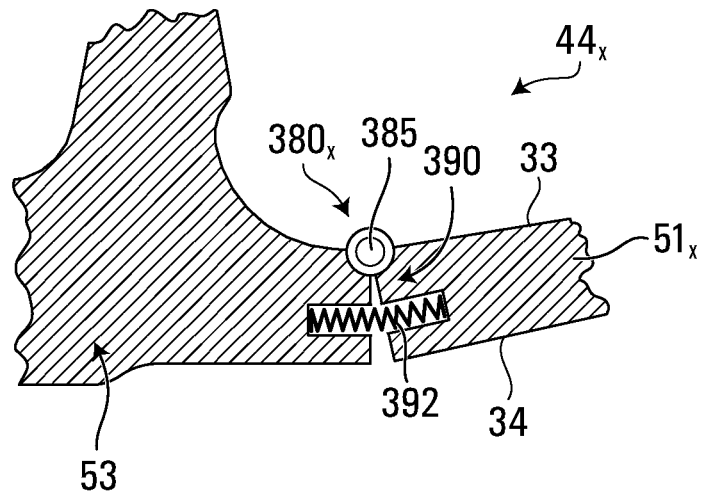

For example, in some embodiments, as shown in FIGS. 24 and 25, the locking mechanism 390 may comprise a spring 392 to spring-load the core $44_i$ such that the movable mechanical joint $380_x$ is unlocked, i.e., changes from its locked state to its unlocked state, in response to a force sufficient to overcome a spring force exerted by the spring 392 upon the lateral part 70 of track 22 contacting the curb or other object 72 on the ground. Once the curb or other object 72 on the ground is cleared, the movable mechanical joint $80_x$ is locked, i.e., changes from its unlocked state to its locked state, under action of the spring 392. The spring 392 may be a coil spring, an elastomeric spring (e.g., a rubber spring), a fluid spring (e.g., an air spring), or any other resilient object that is operable to change from a first configuration to a second configuration in response to a load and recover the first configuration in response to removal of the load.

Figure 26:
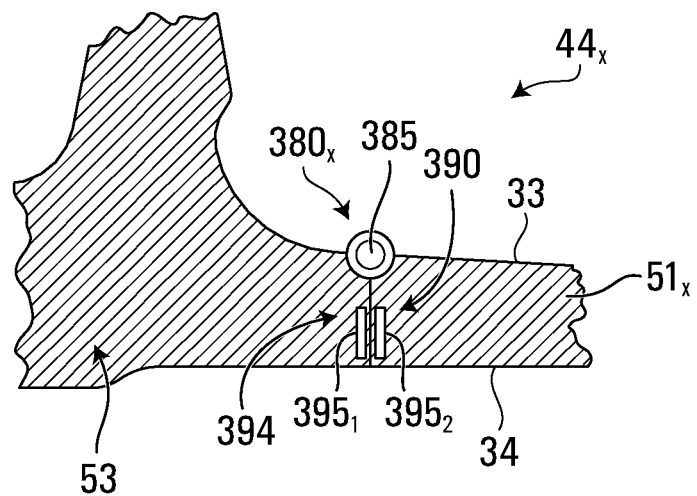
FIGS. 26 and 27 show a core according to yet another embodiment.
Figure 27:
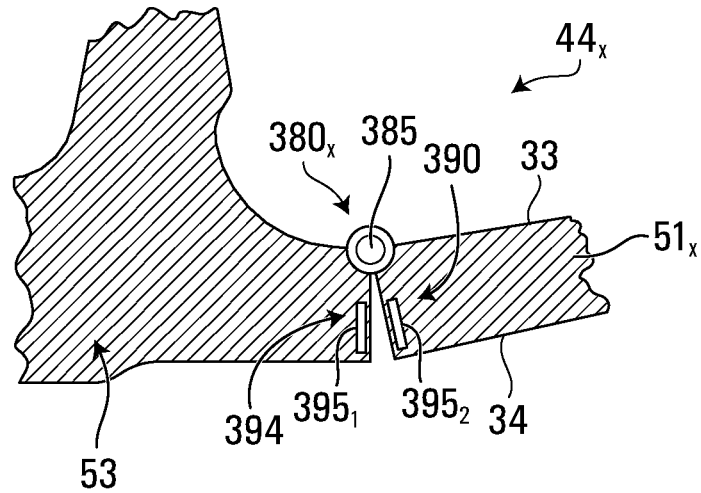
Figure 28:
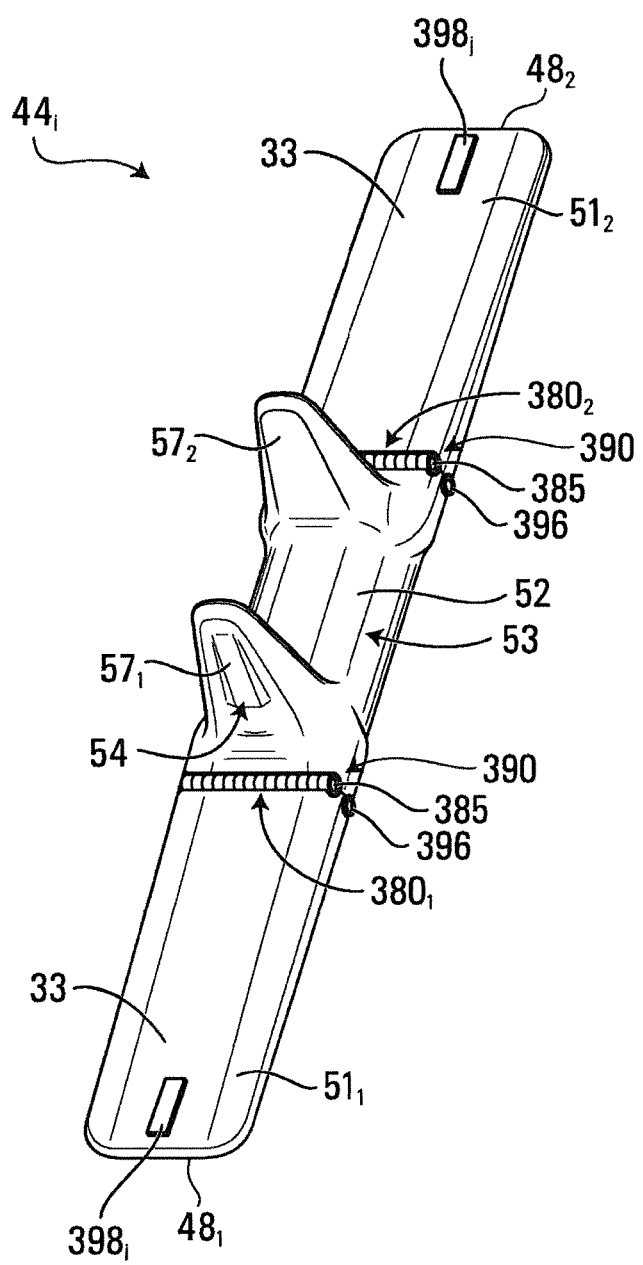
FIGS. 28 to 30 show a core according to yet another embodiment.
Figure 29:
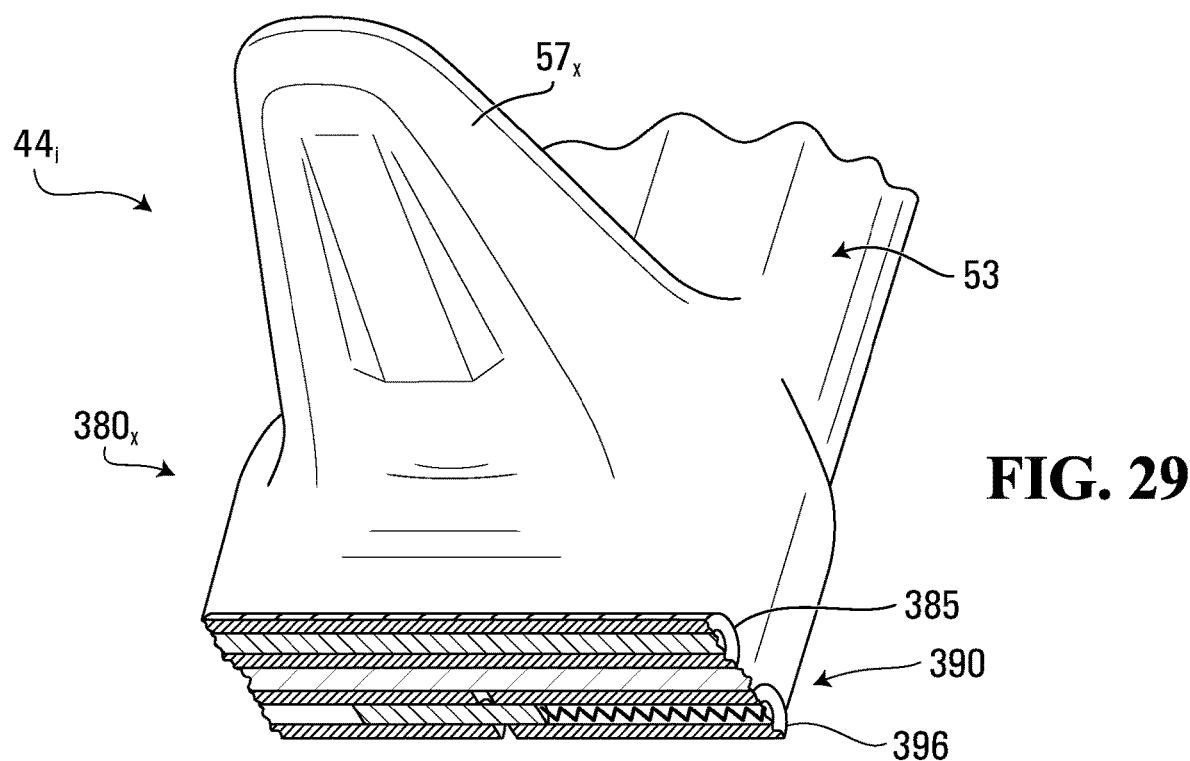
Figure 30:
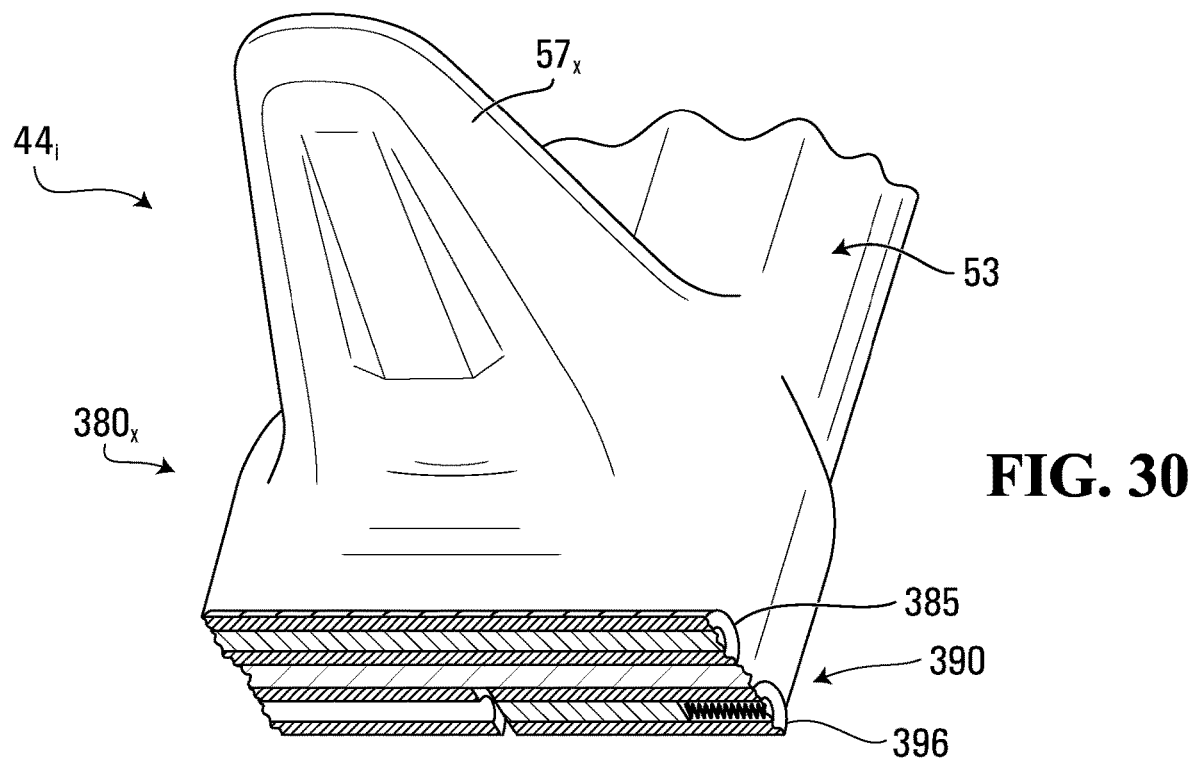
Figure 31:
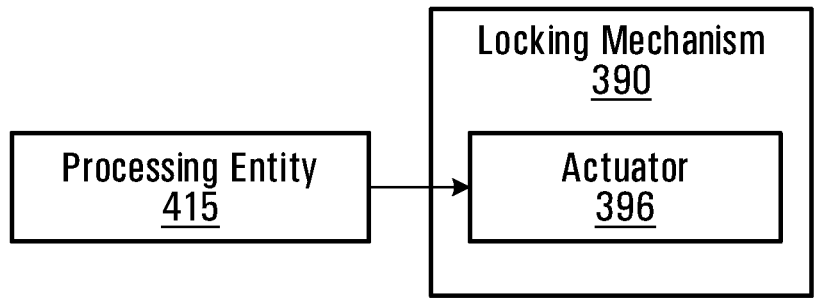
FIGS. 31 to 44 show variants of a control system for the core according to various embodiments.
Figure 32:
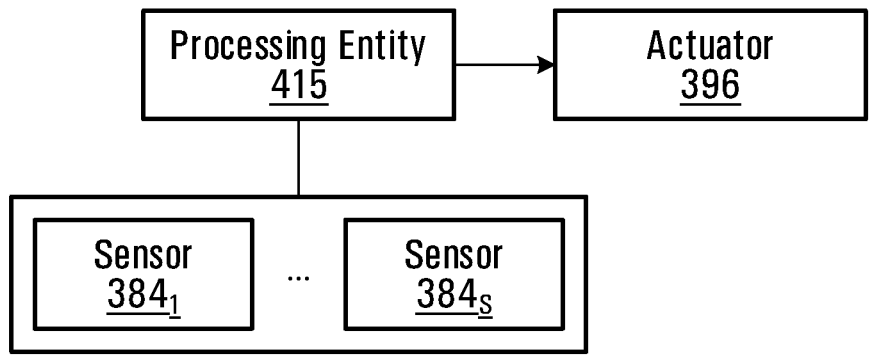
Figure 33:
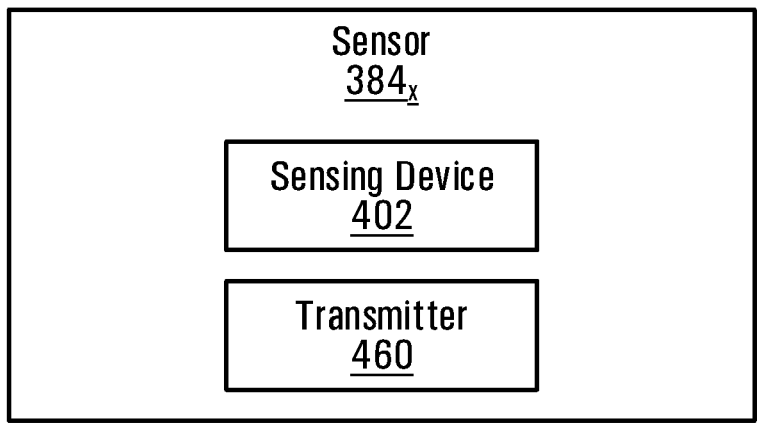
Figure 34:
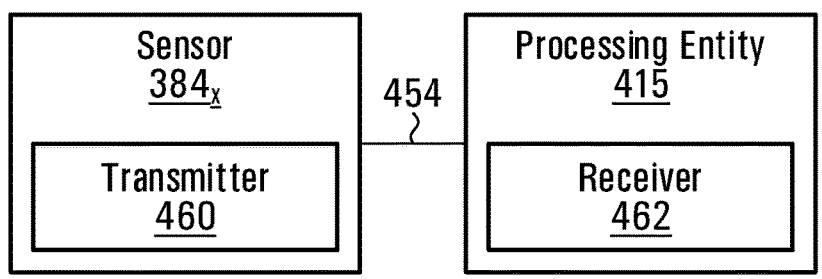

As another example, in some embodiments, as shown in FIGS. 26 and 27, the locking mechanism 390 may comprise a magnet assembly 394 comprising magnets $395_1$, $395_2$, to support the core $44_i$ such that the movable mechanical joint $380_x$ is unlocked, i.e., changes from its locked state to its unlocked state, in response to a force sufficient to overcome a magnetic force exerted by the magnet assembly 394 upon the lateral part 70 of track 22 contacting the curb or other object 72 on the ground. The magnets $395_1$, $395_2$ may be permanent magnets or may be a ferromagnetic material submitted to an electric current. The magnets $395_1$, $395_2$ may be maintained to the core $44_x$ by any suitable means (e.g. fastening, etc.) or may be integral with the core $44_x$ As another example, in some embodiments, as shown in FIGS. 28 to 39, the locking mechanism 390 may comprise an actuator 396 operable to selectively lock and unlock the movable mechanical joint $380_x$. The actuator 396 may comprise an electromechanical actuator, a fluidic (e.g., hydraulic or pneumatic) actuator, or any other suitable device to change the movable mechanical joint $80_x$ between its locked and unlocked states. For example, in this embodiment, the actuator 396 may include an electromechanically-movable locking member (e.g., pin) that is movable relative to another locking member (e.g., an opening) to selectively allow and prevent pivoting of the wing $51_x$ relative to the wheel engager 53 about the pivot 385.

In this embodiment, a processing entity 415 is configured to perform actions, including to control the actuator 396 of the locking mechanism 390. The actuator 396 is configured to selectively lock and unlock the movable mechanical joint $380_x$ to vary the longitudinal stiffness of the given one of the wings $51_1$ $51_2$ of the core $44_i$ in response to a command. In various embodiments, as further discussed below, this command, which may be referred to as a "stiffness-variation command", may be generated automatically by the processing entity 415 and/or may be provided to the processing entity 415 by an individual such as the user of the vehicle 10.

For example, in some embodiments, the processing entity 415 may automatically control (i.e., without user input) the actuator 396 to selectively lock and unlock the movable mechanical joint $380_x$ to vary the longitudinal stiffness of the given one of the wings $51_1$, $51_2$ of the core $44_i$. The stiffness-variation command may thus be automatically generated by the processing entity 415 to control the actuator 396.

Automatic control of the actuator 396 by the processing entity 415 may be effected based on various information. For instance, in this embodiment, the track 22 comprises sensors $398_1$-$398_s$ for sensing one or more physical aspects of the track 22 to provide at least part of the information used by the processing entity 415 to control the actuator 396.

Each sensor $398_i$ is configured to sense a physical aspect of the track 22 to issue a sensor signal derived based on the physical aspect that it senses. The sensor $398_i$ comprises a sensing device 402 to sense the physical aspect of the track 22 that is sensed. For example, in some embodiments, the physical aspect that can be sensed by the sensor $398_i$ may be:
- a pressure on the track 22, such as a pressure on the lateral part 70 of the track 22, in which case the sensor $398_i$; is a pressure sensor. For instance, in some embodiments, the sensing device 402 may comprise a pressure transducer or any other type of sensing device capable of sensing pressure;
- a strain of the track 44, such as a strain of the lateral part 70 of the track 22, in which case the sensor $398_i$; is a strain sensor;
- a force applied onto the track 22, such as a force applied onto the lateral part 70 of the track 22, in which case the sensor $398_i$; is a force sensor (e.g., a load cell);
etc.

The sensor $398_i$ is configured to communicate the signal indicative of the physical aspect it senses to the processing entity 415 via a communication link 454. To that end, the sensor $398_i$ comprises a transmitter 460 for transmitting the signal indicative of the physical aspect it senses to the processing entity 415, which comprises a receiver 462 to receive the signal from the sensor $398_i$.

The transmitter 460 of the sensor $398_i$ and the receiver 462 of the processing entity 415 may establish the link 454 between one another in any suitable way. In some embodiments, the link 454 may be a wired link such that the sensor $398_i$ and the processing entity 415 are connected by a wire. In other embodiments, the link 454 may be a wireless link such that the sensor $398_i$ and the processing entity 415 are connected wirelessly. In such embodiments, the transmitter 460 of the sensor $398_i$ is a wireless transmitter that can wirelessly transmit the signal from the sensor $398_i$ and the receiver 462 of the processing entity 415 is a wireless receiver that can wirelessly receive the signal. For example, in some embodiments, the transmitter 460 and the receiver 462 may implement radio-frequency identification (RFID) technology. In such an example, the transmitter 460 may be an RFID tag while the receiver 462 may be an RFID reader (e.g., active, passive or battery-assisted passive (BAP) RFID technology). Any other wireless communication technology may be used in other examples (e.g., WiFi, dedicated short-range communication (DSRC), etc.).

The processing entity 415 is configured to issue the stiffness-variation command to the actuator 396 to selectively lock and unlock the movable mechanical joint $380_x$ to vary the longitudinal stiffness of the given one of the wings $51_1$, $51_2$ of the core $44_i$ based on information derived from the sensor $398_i$ and possibly other information.

Figure 35:
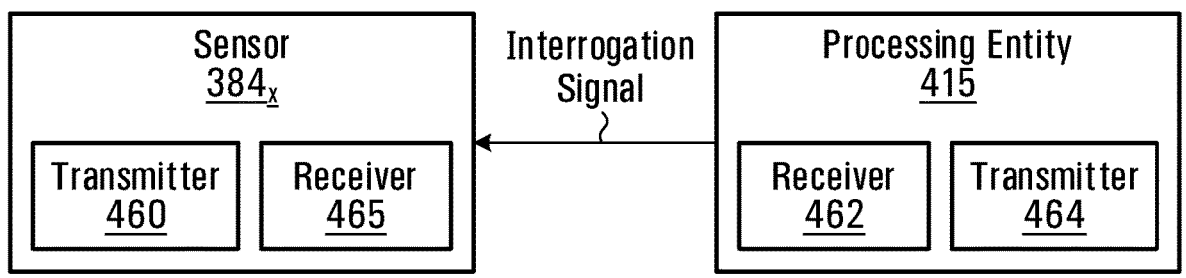
Figure 36:
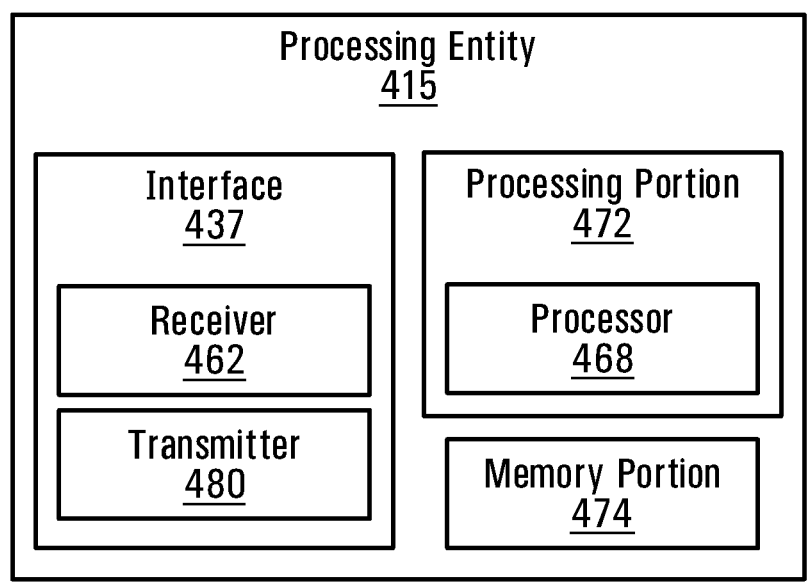
Figure 37:
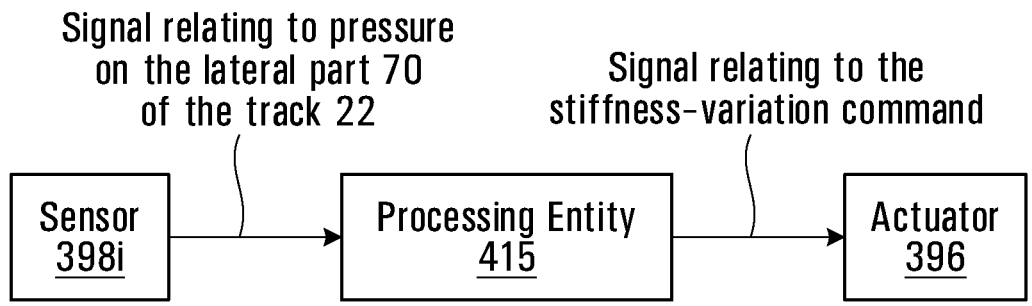
Figure 38:
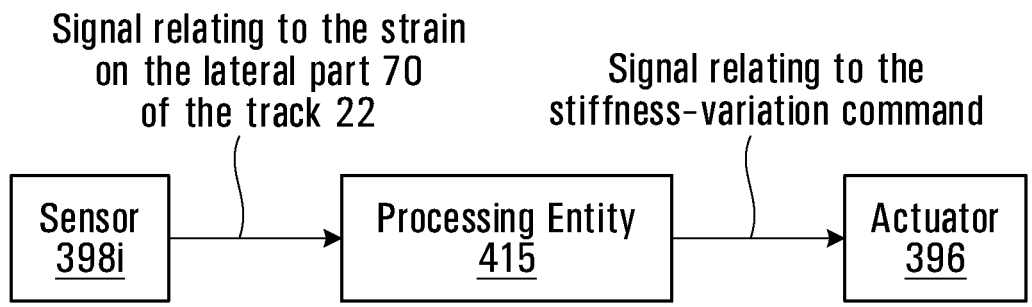
Figure 39:
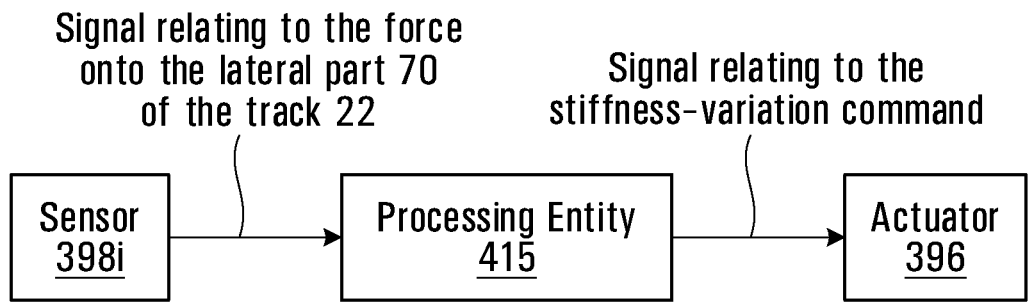

In this embodiment, as shown in FIG. 35, the processing entity 415 comprises an interface 470, a processing portion 472, and a memory portion 474, which are implemented by suitable hardware and/or software.

The interface 470 comprises one or more inputs and outputs allowing the processing entity 415 to receive input signals from and send output signals to other components to which the processing entity 415 is connected (i.e., directly or indirectly connected). For example, in this embodiment, an input of the interface 466 is implemented by the receiver 462 to receive the signal from the sensor $398_i$. An output of the interface 470 is implemented by a transmitter 480 to transmit the stiffness-variation command to the actuator 396.

The processing portion 472 comprises one or more processors for performing processing operations that implement functionality of the processing entity 415. A processor of the processing portion 468 may be a general-purpose processor executing program code stored in the memory portion 474. Alternatively, a processor of the processing portion 472 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 474 comprises one or more memories for storing program code executed by the processing portion 472 and/or data used during operation of the processing portion 472. A memory of the memory portion 474 may be a semiconductor medium (including, e.g., a solid-state memory), a magnetic storage medium, an optical storage medium, and/or any other suitable type of memory. A memory of the memory portion 474 may be read-only memory (ROM) and/or random-access memory (RAM), for example.

In some embodiments, two or more elements of the processing entity 415 may be implemented by devices that are physically distinct from one another and may be connected to one another via a bus (e.g., one or more electrical conductors or any other suitable bus) or via a communication link which may be wired, wireless, or both. In other embodiments, two or more elements of the processing entity 415 may be implemented by a single integrated device.

Also, in some embodiments, the processing entity 415 and the sensor $398_i$ may be part of the track 22 (e.g., possibly implemented by a single device). In other embodiments, the processing entity 415 may be external to the track 22 (e.g., part of the track system $16_i$, or reside elsewhere on the vehicle 10).

In this embodiment, in response to the lateral part 70 of track 22 contacting the curb or other object 72 on the ground, the sensor $398_i$ detects this contact (e.g., because of the pressure, force or strain sensed by the sensor $398_i$) and its sensor signal transmitted to the processing entity 415 is indicative of this contact, such that the processing entity 415 can proceed to issue the stiffness-variation command to the actuator 396 to unlock the movable mechanical joint $380_x$ in order to decrease the longitudinal stiffness of the given one of the wings $51_1$, $51_2$ of the core $44_i$ (e.g., when the sensor signal from the sensor $398_i$ indicates that the pressure, force or strain on the lateral part 70 of track 22 is high enough to warrant such decrease). Once the curb or other object 72 on the ground is cleared, the sensor $398_i$ detects this clearance (e.g., because of the pressure, force or strain sensed by the sensor $398_i$) and its sensor signal transmitted to the processing entity 415 is indicative of this clearance, whereby the processing entity 415 can proceed to issue the stiffness-variation command to the actuator 396 to lock the movable mechanical joint $380_x$ in order to increase the longitudinal stiffness of the given one of the wings $51_1$, $51_2$ of the core $44_i$ (e.g., when the sensor signal from the sensor $398_i$ indicates that the pressure, force or strain on the lateral part 70 of track 22 is low enough to warrant such increase).

Figure 40:
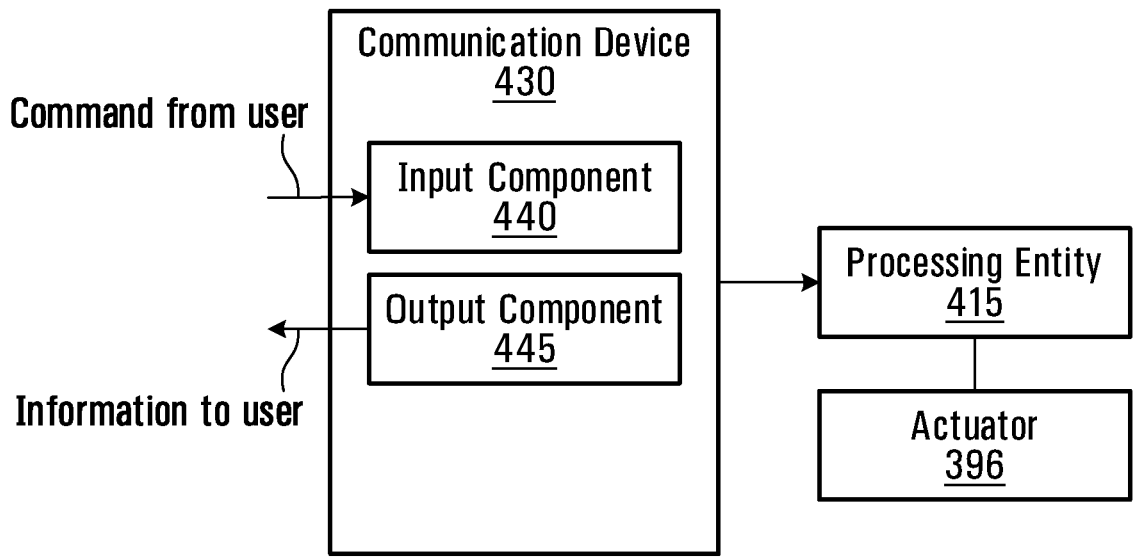
Figure 41:
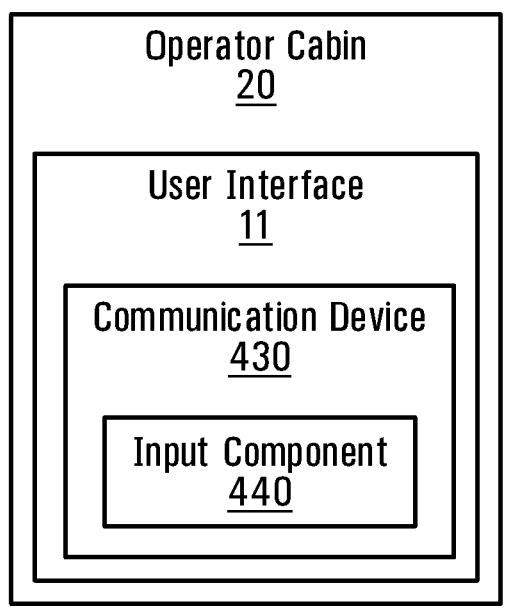

With additional reference to FIGS. 40 and 41, in some embodiments, an individual such as the user of the vehicle 10 may provide the stiffness-variation command in order to control the actuator 396 to selectively lock and unlock the movable mechanical joint $80_x$ to vary the longitudinal stiffness of the given one of the wings $51_1$, $51_2$ of the core $44_i$. The stiffness-variation command may thus be provided to the processing entity 415 by the user to control the actuator 396 "on-demand" (e.g., in situations in which the vehicle 10 is arriving in an area including many curbs or other objects on the ground that the track 22 may impact).

A communication device 430 can be used by the user to communicate with the processing entity 415. The communication device 430 comprises an input component 440 that the user can act upon to input the stiffness-variation command in order to control the actuator 396. For example, in some embodiments, the input component 440 may comprise a mechanical input element, such as a button, a switch, a lever, a dial, a knob, or any other physical element, and/or a virtual input element, such as a virtual button or other virtual control of a graphical user interface (GUI) displayed on a screen that the user can act upon. The communication device 430 may also comprise an output component 445 that can convey information to the user in order to facilitate control of the actuator 396. In some embodiments, the output component 445 may comprise a display for displaying information to the user or a speaker for emitting sound (e.g., an alarm, an utterance, etc.). For example, in some embodiments, the output component 445 may convey the pressure, force or strain on the lateral part 70 of track 22.

The user can interact with the communication device 430 to provide the stiffness-variation command to the processing entity 415 to control the actuator 396 to selectively lock and unlock the movable mechanical joint $380_x$ to vary the longitudinal stiffness of the given one of the wings $51_1$, $51_2$ of the core $44_i$.

For example, in some embodiments, the communication device 430 may be part of the user interface 11 of the operator cabin 20 of the vehicle 10 (e.g., the input component 440 of the communication device 430 may be part of the instrument panel of the vehicle 10).

Figure 42:
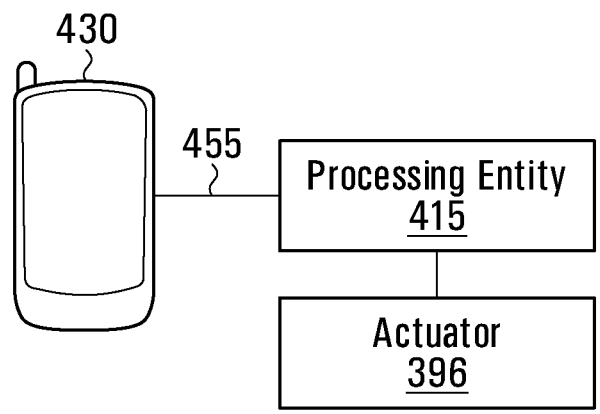

As another example, in some embodiments, with additional reference to FIG. 42, the communication device 430 may be a personal communication device (e.g., a smartphone, a computer, etc.) or other device that is usable by the user and distinct from and not built into the user interface 11 of the operator cabin 20 of the vehicle 10. This may be useful, for instance, in situations where the vehicle 10 was not originally manufactured with the track 22 and/or is not readily modifiable to allow interaction between the processing entity 415 and the user interface 11.

The communication device 430 may interact with the processing entity 415 over a communication link 455, which may be wireless and/or wired (e.g., Bluetooth or other short-range or near-field wireless connection, WiFi or other wireless LAN, WiMAX or other wireless WAN, cellular, Universal Serial Bus (USB), etc.). For example, in some embodiments, the communication device 430 may be:

- a smartphone or other wireless phone; a tablet computer; a head-mounted display, smartwatch or other wearable device; or any other communication device carried, worn or otherwise associated with the user;
- a server or other computing entity (e.g., implementing a website) associated with: the user; an organization associated with the user (a manufacturer of the track 22 and/or of the vehicle 10; a retailer, distributor, or other vendor of the track 22 and/or the vehicle 10; or any other party who may have an interest in the track 22 and/or the vehicle 10;
- etc.

In some cases, such as where the communication device 430 is a smartphone, tablet, head-mounted display, smartwatch, or other communication device carried or worn by the user, communication between the communication device 430 and the processing entity 415 may be direct, i.e., without any intermediate device. For instance, in some embodiments, this can be achieved by pairing (e.g., Bluetooth pairing) the communication device 430 and the processing entity 415. In other cases, such as where the communication device 430 is remote from the processing entity 415, communication between the communication device 430 and the processing entity 415 may be indirect, e.g., through one or more networks and/or one or more additional communication devices. For example, in some embodiments, the processing entity 415 may communicate (e.g., via the transmitter 464 and/or the receiver 462 of the processing entity 415) with a WiFi hotspot or cellular base station, which may provide access to a service provider and ultimately the Internet or another network, thereby allowing the processing entity 415 and the communication device 430 to communicate.

For example, in some embodiments, the communication device 430 may be a smartphone or other mobile phone, a tablet, a smart watch, head-mounted display or other wearable device, or any other communication device that may be carried by the user, and the communication link 455 may be a short-range wireless link (e.g., Bluetooth) or a wired link (e.g., USB); in other embodiments, the communication device 430 may be a server or other computing entity or a smartphone or other mobile phone, a tablet, a smart watch, head-mounted display or other wearable device, or any other communication device that may be carried by the user and the communication link 455 may be implemented by a data network such as the Internet over a wired connection and/or a wireless connection (e.g., WiFi, WiMAX, cellular, etc.); and, in other embodiments, the communication device 430 may be a server or other computing entity and the communication link 455 may be implemented over a wireless connection using, for instance, dedicated short-range communication (DSRC), IEEE 802.11, Bluetooth and CALM (Communications Access for Land Mobiles), RFID, etc.

In some embodiments, an application ("app", i.e., software) may be installed on the communication device 430 to interact with the processing entity 415. For example, in some embodiments, such as where the communication device 430 is a smartphone, a tablet, a computer, etc., the user may download the app from a repository (e.g., Apple's App Store, iTunes, Google Play, Android Market, etc.) or any other website onto the communication device 430. Upon activation of the app on the communication device 430, the user may access certain features locally on the communication device 430. In addition, a data connection can be established over the Internet with a server of which executes a complementary server-side application interacting with the app on the communication device 430.

For example, in some embodiments, the communication device 430 may be a smartphone of the user of the vehicle 10, onto which an app to interact with the processing entity 415 has been installed (e.g., downloaded).

Figure 43:
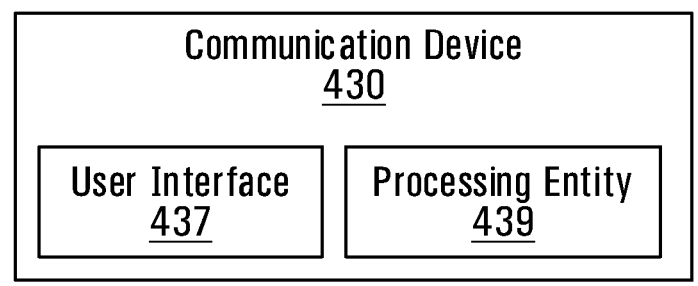
Figure 44:
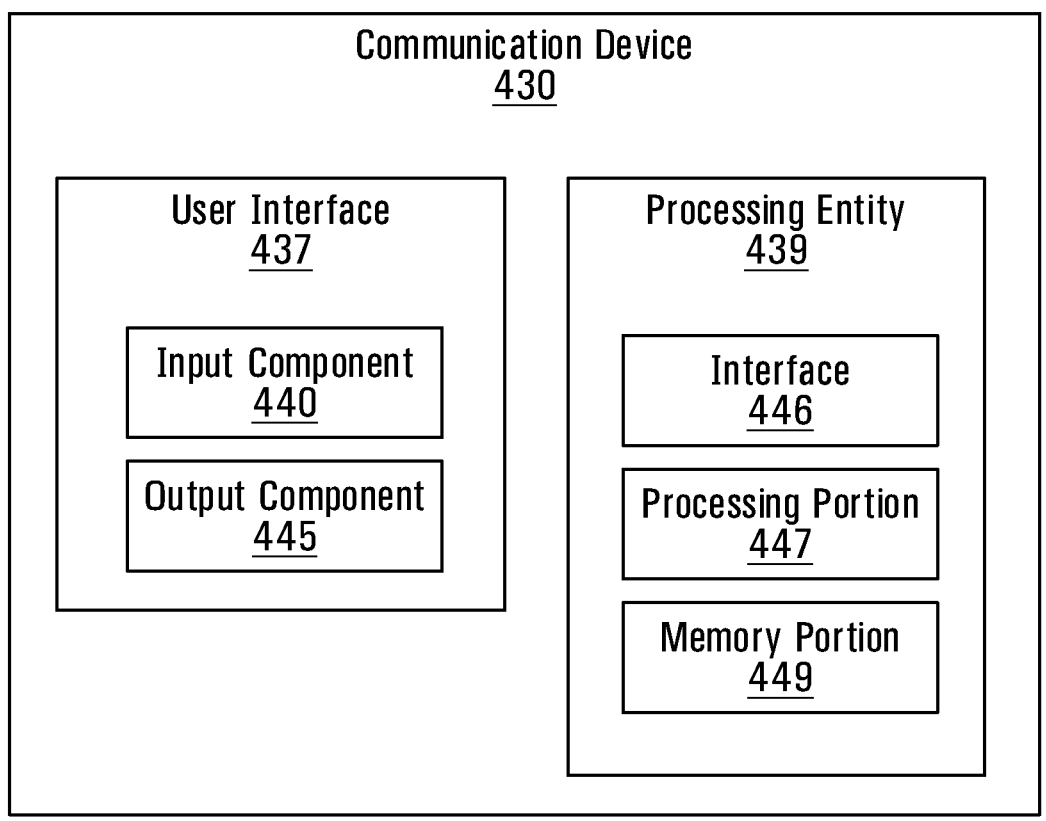

In various embodiments, as shown in FIGS. 43 and 44, the communication device 430 (e.g., whether part of the user interface 11 of the operator cabin 20, or a personal communication device such as a smartphone, tablet, computer, etc.) may comprise a user interface 437 and a processing entity 439. The user interface 437 comprises the input component 440 and, if applicable, the output component 445 (e.g., buttons, knobs, etc., a display, a speaker, etc., of the operator cabin 20, of a smartphone, etc.). The processing entity 439 comprises an interface 446, a processing portion 447, and a memory portion 449, which are implemented by suitable hardware and/or software.

The interface 446 comprises one or more inputs and outputs allowing the processing entity 439 to receive input signals from and send output signals to other components to which the processing entity 439 is connected (i.e., directly or indirectly connected). For example, in this embodiment, an output of the interface 446 is implemented by a transmitter (e.g., a wireless transmitter) to transmit a signal to the processing entity 415 or the user interface 437. An input of the interface 446 is implemented by a receiver to receive a signal from the user interface 437 or the processing entity 415.

The processing portion 447 comprises one or more processors for performing processing operations that implement functionality of the processing entity 439. A processor of the processing portion 447 may be a general-purpose processor executing program code stored in the memory portion 449. Alternatively, a processor of the processing portion 447 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 449 comprises one or more memories for storing program code executed by the processing portion 447 and/or data used during operation of the processing portion 447. A memory of the memory portion 449 may be a semiconductor medium (including, e.g., a solid-state memory), a magnetic storage medium, an optical storage medium, and/or any other suitable type of memory. A memory of the memory portion 449 may be read-only memory (ROM) and/or random-access memory (RAM), for example.

In some embodiments, two or more elements of the processing entity 439 may be implemented by devices that are physically distinct from one another and may be connected to one another via a bus (e.g., one or more electrical conductors or any other suitable bus) or via a communication link which may be wired. In other embodiments, two or more elements of the processing entity 439 may be implemented by a single integrated device.

As another example, in some embodiments, as shown in FIGS. 45 to 63, the variable stiffness structure of each core 44$_i$ of the track 22 may be implemented by the core 44$_i$ comprising a variable-stiffness material 550 such that the longitudinal stiffness of the given one of the wings 51$_1$, 51$_2$ of the core 44$_i$ may decrease in response to the lateral part 70 of the track 22 contacting the curb or other object 72 on the ground to allow flexion of the given one of the wings 51$_1$, 51$_2$.

The variable-stiffness material 550 has a stiffness that is variable based on an external stimuli so that the stiffness is relatively higher when a force on the lateral part 70 of the track 22 is relatively low, which indicates that there is no contact with any curb or other object on the ground that would generate significant stress in the lateral part 70 of the track 22, and relatively lower when the force of the lateral part 70 of the track 22 is relatively high, which indicates that there is contact between the curb or other object 72 on the ground.

For example, in some embodiments, this may be achieved by varying a temperature of the variable-stiffness material 550 in the given one of the wings 51$_1$, 51$_2$ of the core 44$_i$ to locally change mechanical properties of the variable-stiffness material 550. For example, raising the temperature of the variable-stiffness material 550 in the given one of the wings 51$_1$, 51$_2$ may locally reduce the stiffness of the variable-stiffness material 550.

As another example, alternatively or additionally, in some embodiments, this may be achieved by subjecting the variable-stiffness material 550 in the given one of the wings 51$_1$, 51$_2$ of the core 44$_i$ to an electric current and/or a magnetic field to locally change mechanical properties of the variable-stiffness material 550. For example, raising the electrical current going through the variable-stiffness material 550 of the given one of the wings 51$_1$, 51$_2$ may locally increase the stiffness of the variable-stiffness material 550. Conversely, in this example, reducing or interrupting the electrical current going through the variable-stiffness material 550 of the given one of the wings 51$_1$, 51$_2$ may locally reduce the stiffness of the variable-stiffness material 550.

Figure 45:
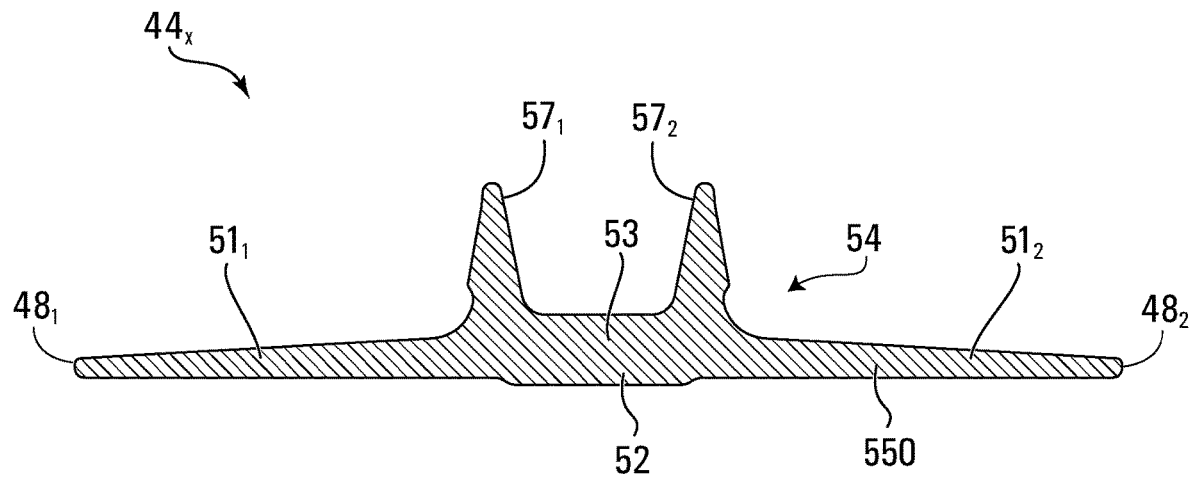
FIG. 45 shows a core according to another embodiment.
Figure 46:
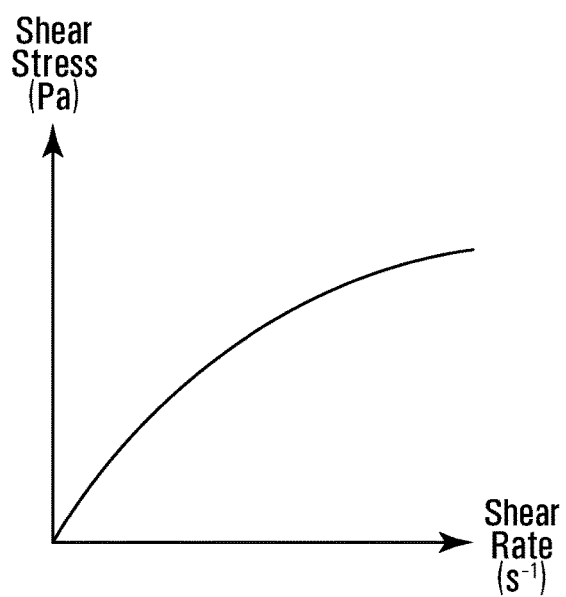
FIG. 46 illustrates a behavior of a shear-thinning material.
Figure 47:
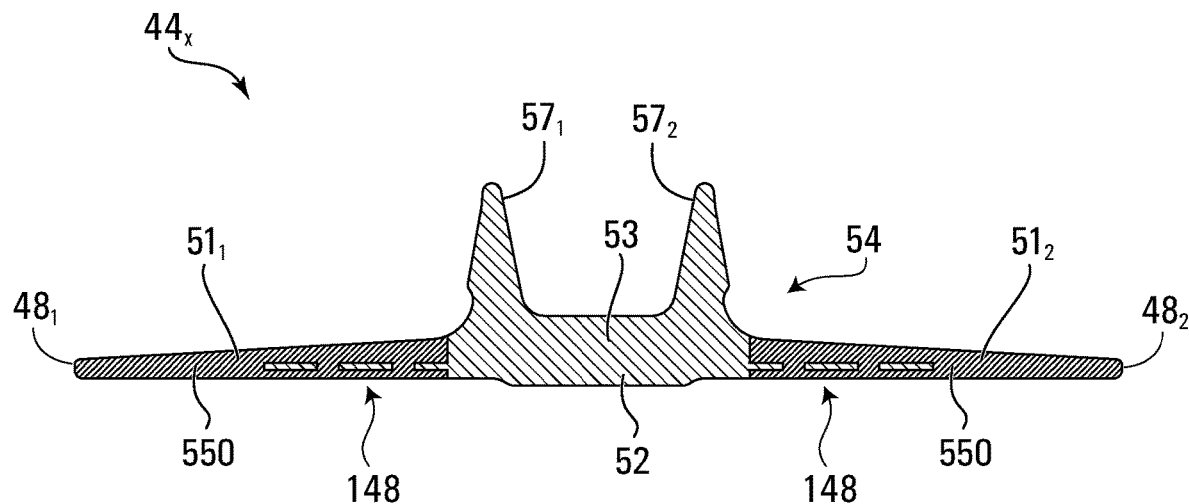
FIG. 47 shows another example of implementation of the core.

In an example of implementation, as shown in FIGS. 45 to 47, the variable-stiffness material 550 comprises a shear thinning material (also referred to as "pseudoplastics"), whose stiffness and/or viscosity generally diminishes when a shear stress gets generally greater. When the force on the lateral part 70 of the track is relatively high, which indicates that there is contact between the curb or other object 72 on the ground, the shear stress in the variable-stiffness material 550 generally gets greater, thus reducing the stiffness and/or viscosity of the variable-stiffness material 550 and allowing flexion of the given one of the wings 51$_1$, 51$_2$. The core 44$_x$ may be entirely made of the shear thinning material 550. Alternatively, only the wings 51$_1$, 51$_2$ may comprise the shear thinning material 550.

Figure 48:
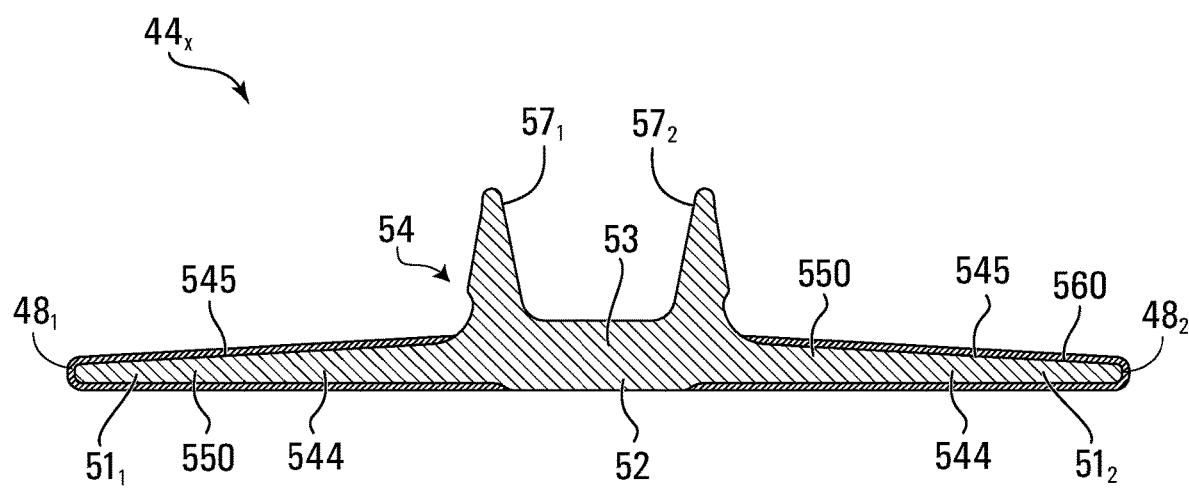
FIG. 48 shows another example of implementation of the core.
Figure 49:
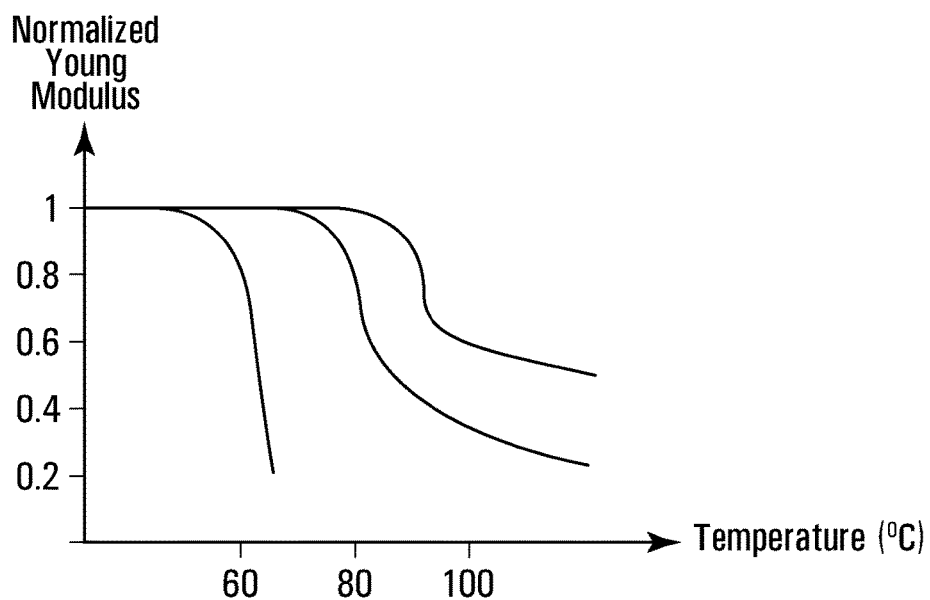
FIG. 49 illustrates a behavior of variable-stiffness materials.
Figure 50:
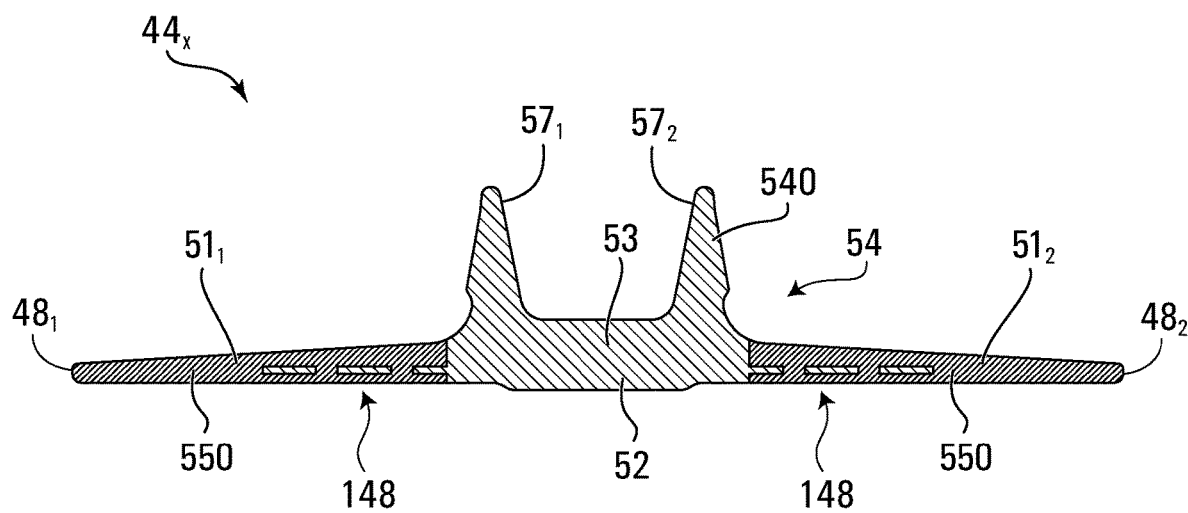
FIG. 50 shows another example of implementation of the core.
Figure 51:
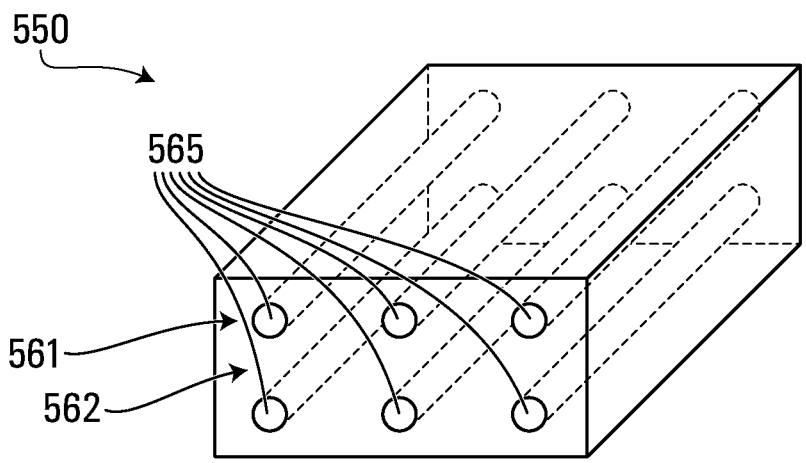
FIGS. 51 to 53 show variable-stiffness materials.
Figure 52:
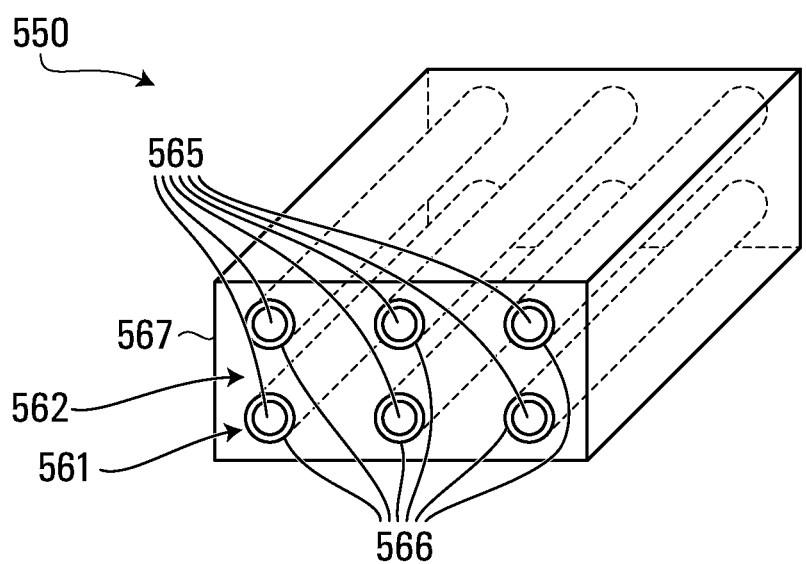
Figure 53:
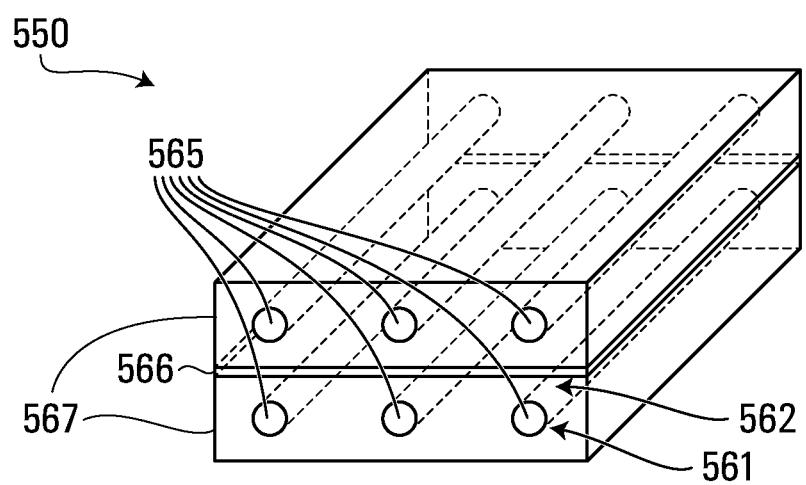
Figure 54:
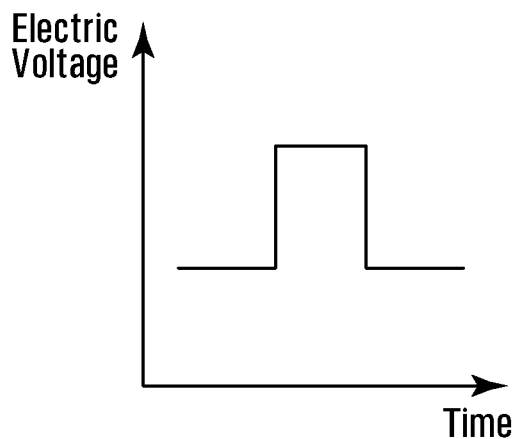
FIGS. 54 to 59 show different control functions.
Figure 57:
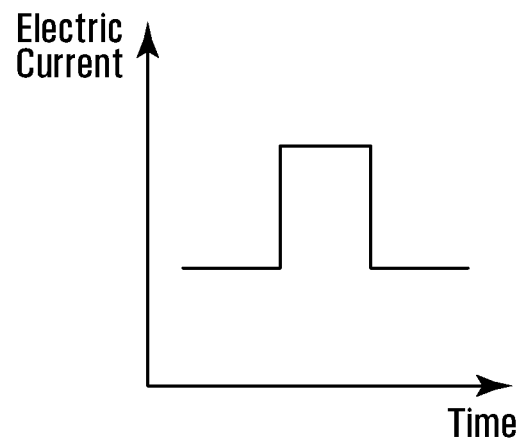
Figure 55:
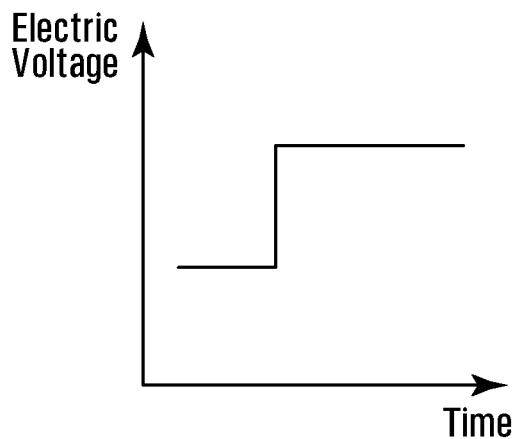
Figure 58:
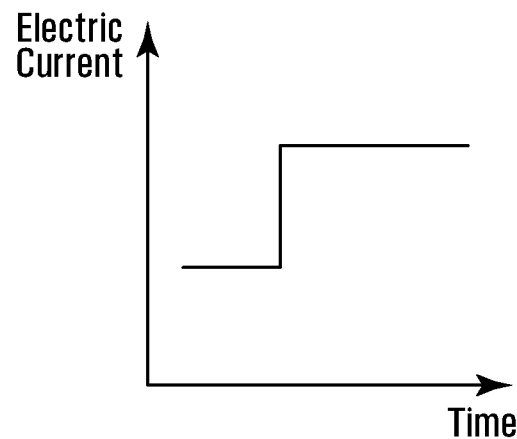
Figure 56:
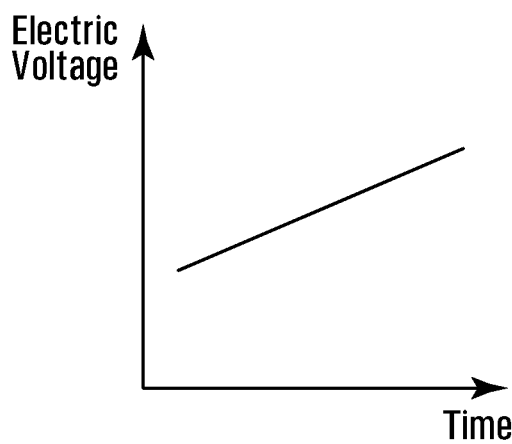
Figure 59:
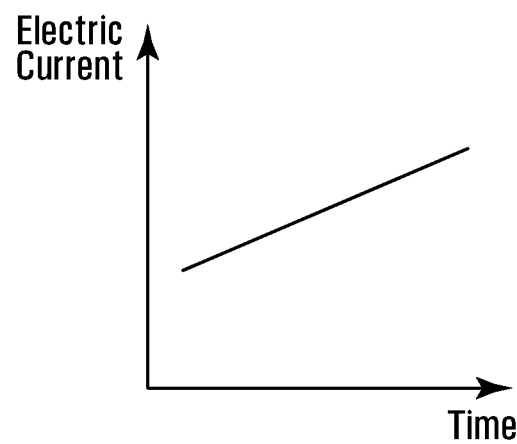

In another example of implementation, with additional reference to FIGS. 48 and 49, the core 44$_x$ may comprise the variable-stiffness material 550 and an electrical resistive structure 560 engaging a surface 545 of the a part 544 of the core 44$_x$ comprising the variable-stiffness material 550. In this implementation, the variable-stiffness material 550 may have mechanical properties (e.g., hardness, rigidity, etc.) which vary significantly when a temperature of the variable-stiffness material 550 varies and/or when the temperature of the variable-stiffness material 550 reach a certain threshold. The electrical resistive structure 560 may be subjected to an electrical current and/or a voltage, which may cause the electrical resistive structure 560 to dissipate heat and increase the temperature of the variable-stiffness material 550 over said threshold, thus varying significantly the mechanical properties (e.g., hardness, rigidity, etc.) of the variable-stiffness material 550.

In yet another example of implementation, with additional reference to FIGS. 50 to 53, the variable-stiffness material 550 may be an electrical resistive structure. In this implementation, the variable-stiffness material 550 is comprised in the wings 51$_1$, 51$_2$ and the wheel engager 53 comprises a different material 540. The variable-stiffness material 550 may have mechanical properties (e.g., hardness, rigidity, etc.) which vary significantly when a temperature of the variable-stiffness material 550 varies and/or when the temperature of the variable-stiffness material 550 reach a certain threshold. The variable-stiffness material 550 may also be subjected to an electrical current and/or a voltage, which may cause the variable-stiffness material 550 to dissipate heat and increase its temperature over said threshold, thus varying significantly its mechanical properties (e.g., hardness, rigidity, etc.). In this example, the variable-stiffness material 550 is a composite material comprising a fiber part 561 and a matrix part 562. More particularly, the fiber part 561 of the composite variable-stiffness material 550 comprises carbon fibers 565 and/or a thermoplastic material 566 and/or a thermoset plastic 567. The matrix part 562 of the composite variable-stiffness material 550 comprises thermoplastic material 566 and/or thermoset plastic 567. As illustrated in FIGS. 54 to 59, the electrical current and/or voltage may follow a pulse, a ramp, a step, or any suitable function.

Figure 60:
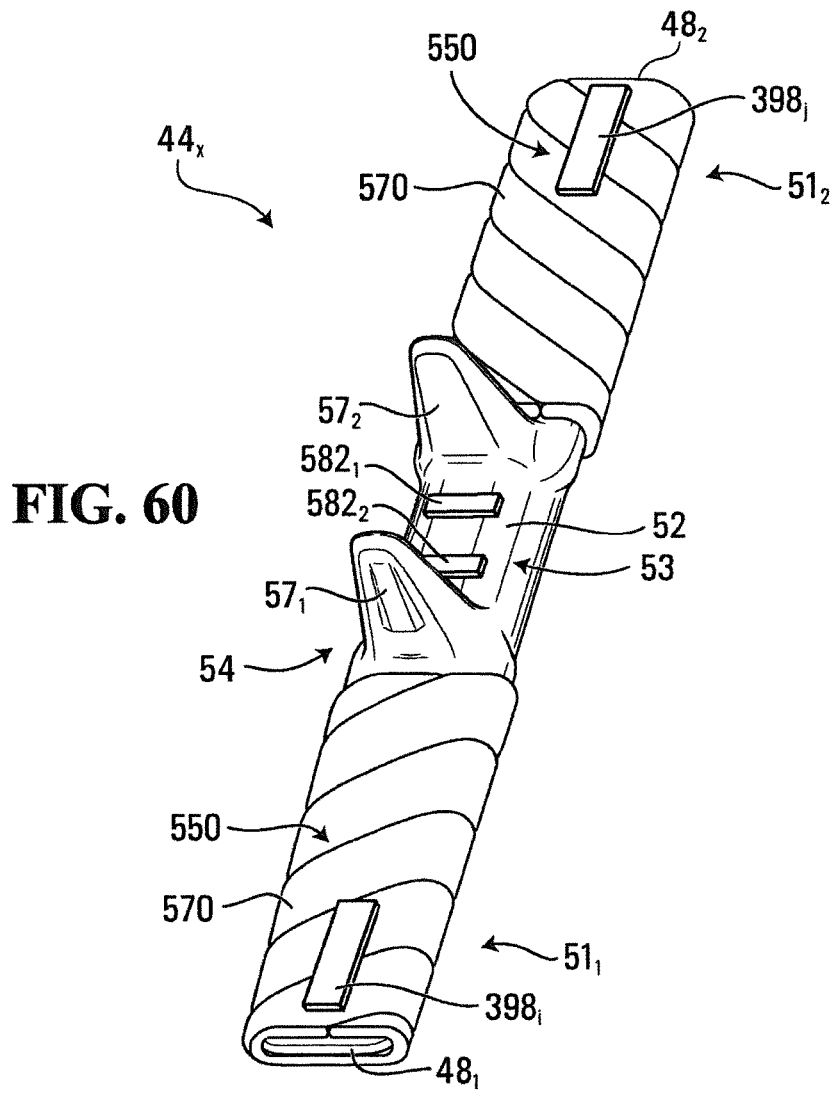
FIGS. 60 and 61 shows another example of implementation of the core.
Figure 61:
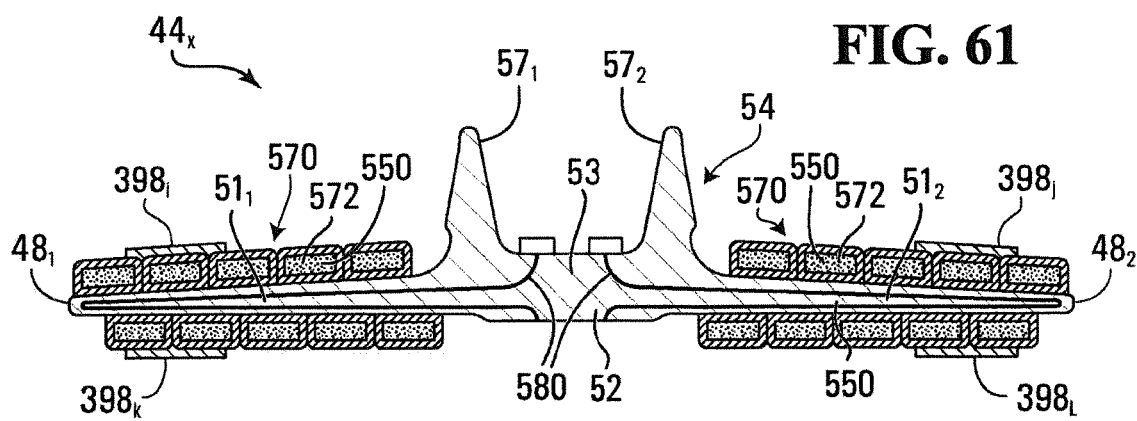
Figure 62:
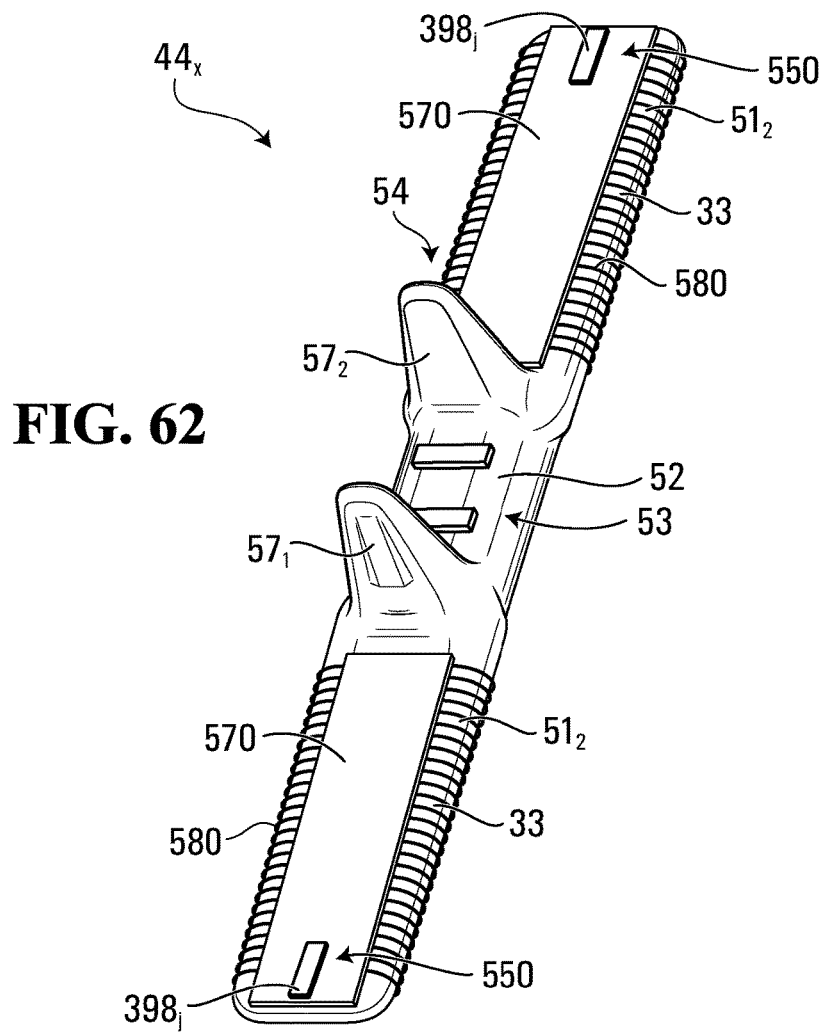
FIGS. 62 and 63 show another example of implementation of the core.
Figure 63:
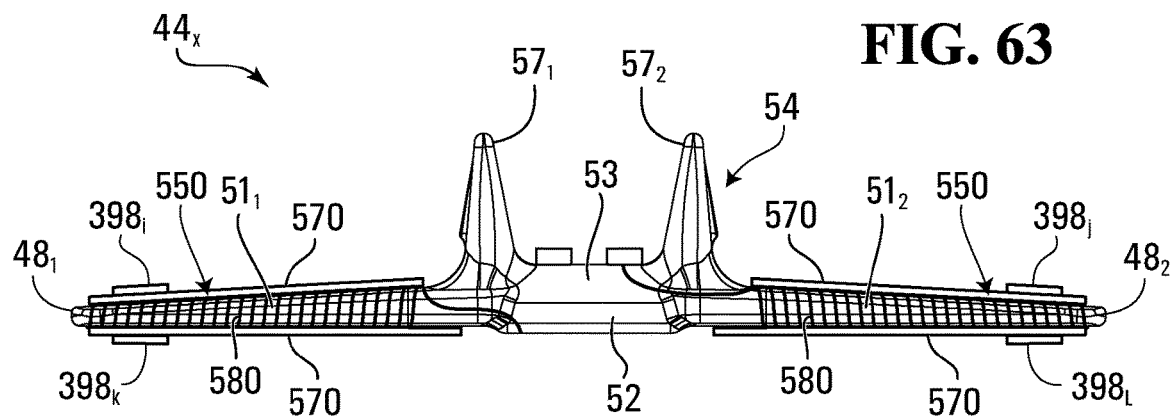

In yet another example of implementation, with additional reference to FIGS. 60 and 61, the core $44_x$ may comprise a structure 570 comprising the variable-stiffness material 550 and an electrical conductor 580. In this implementation, the structure 570 comprises a soft, firm or rigid channel 572 disposed in a periphery of each of the wings $51_1$, $51_2$, and engaging a surface of the wings $51_1$, $51_2$. The electrical conductor 580 is disposed in a manner generally parallel to the longitudinal axis 81 of the core $44_x$ and connects to connectors $582_1$-$582_2$ disposed onto and/or under the wheel engager 53 of the core $44_x$. The variable-stiffness material 550 is a rheomagnetic material. An electrical current and/or voltage may be applied on the electrical conductor 580 in a given one of the wings $51_1$, $51_2$ of the core $44_i$ creating a magnetic field which modifies the mechanical properties of the rheomagnetic material 550 in the given one of the wings $51_1$, $51_2$. In this example, when the track is in use, an electrical current is passed through the electrical conductor, creating a magnetic field and increasing the viscosity of the rheomagnetic material 550. This increases the stiffness of the given one of the wings $51_1$, $51_2$ of the core $44_i$. When the force on the lateral part 70 of the track 22 is relatively high, indicating that there is contact between the curb or other object 72 on the ground, the electrical current in the electrical conductor 580 is decreased, reducing the intensity of the magnetic field around the electrical conductor and decreasing the viscosity of the rheomagnetic material 550. This decreases the stiffness of the given one of the wings $51_1$, $51_2$ of the core $44_i$ allowing the given one of the wings $51_1$, $51_2$ to flex. Alternatively, as shown in FIGS. 62 and 63, the structure 570 comprising the soft, firm or rigid channel 572 containing the rheomagnetic variable-stiffness material 550, may be disposed on the surface 33 and under the surface 34 of each of the wings $51_1$, $51_2$, in a manner generally parallel to the longitudinal axis 81 of the core $44_x$, and the electrical conductor 580 may be disposed in a periphery of each of the wings $51_1$, $51_2$, in a manner similar to a coil, and may connect to connectors $582_1$-$582c$, disposed onto and/or under the wheel engager 53 of the core $44_x$.

In some embodiments, instead of or in addition to controlling the actuator 396 of the locking mechanism 390, the processing entity 415 may be configured to perform actions based on signals from the sensors $398_1$-$398_s$, such as to control the vehicle 10 (e.g., a speed of the vehicle 10); convey information to a user (e.g., the operator); transmit information to a remote party (e.g., a provider such as a manufacturer or distributor of the track systems $16_1$, $16_2$ and/or of the vehicle 10; etc.

For example, in some embodiments, the processing entity 415 may issue an output signal regarding the track 22 contacting the curb or other object 72 on the ground based on the sensor signal from a sensor $398_x$ of the track 22 of a track system $16_i$.

Figure 64:
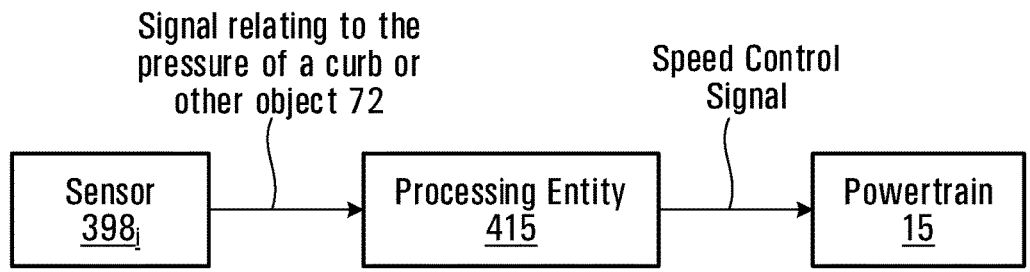
FIGS. 64 to 70 show variants of a monitoring system according to various embodiments.
Figure 65:
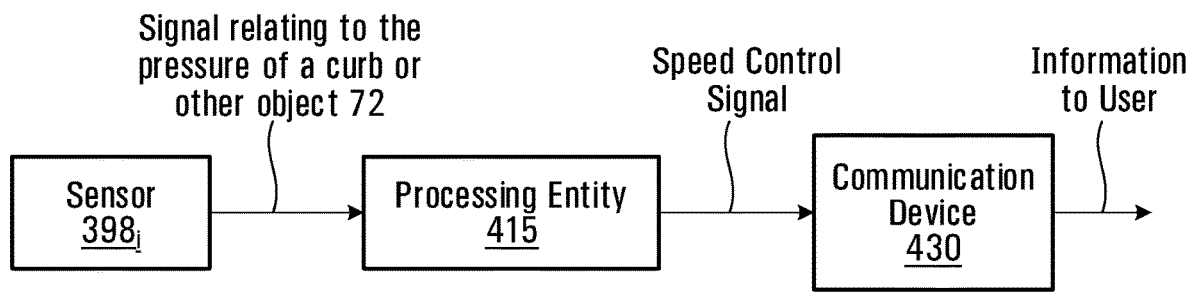

More particularly, in some embodiments, the processing entity 415 may issue an output signal regarding the track 22 contacting the curb or other object 72 on the ground based on the sensor signal from the sensor $398_x$ of the track 22 when the track 22 contacts the curb or other object 72 on the ground. For instance, in some embodiments, the output signal issued by the processing entity 415 may be directed to the powertrain 15 of the vehicle 10 to control (e.g., the speed) of the vehicle 10 (e.g., to stop the vehicle 10 from moving further) when the track 22 contacts the curb or other object 72 on the ground, as shown in FIG. 64. In other embodiments, as shown in FIG. 65, the output signal issued by the processing entity 415 may be directed to the communication device 430 for outputting information regarding the operation of the vehicle 10 to the operator of the vehicle 10 when the track 22 contacts the curb or other object 72 on the ground (e.g., to notify the operator of this contact and that he/she may wish to stop the vehicle 10 from moving further). As another example, in some embodiments, the processing entity 415 may store information about the track 22 in memory (e.g., for future reference), such as a given moment (e.g., date and time) at which the track 22 contacted the curb or other object 72 on the ground.

For instance, with additional reference to FIG. 64, in some embodiments, the output signal issued by the processing entity 415 may be directed to the powertrain 15 of the vehicle 10 to control the vehicle 10 based on the sensor signal of the sensor $398_x$. For instance, the output signal issued by the processing entity 415 may be directed to the powertrain 15 of the vehicle 10 to control the speed of the vehicle 10, such as by limiting and/or reducing the speed of the vehicle 10 (e.g., including to stop the vehicle 10) or by allowing the speed of the vehicle 10 to be increased (e.g., when the sensor $398_x$ indicates that the curb or other object 72 on the ground has been cleared).

Figure 66:
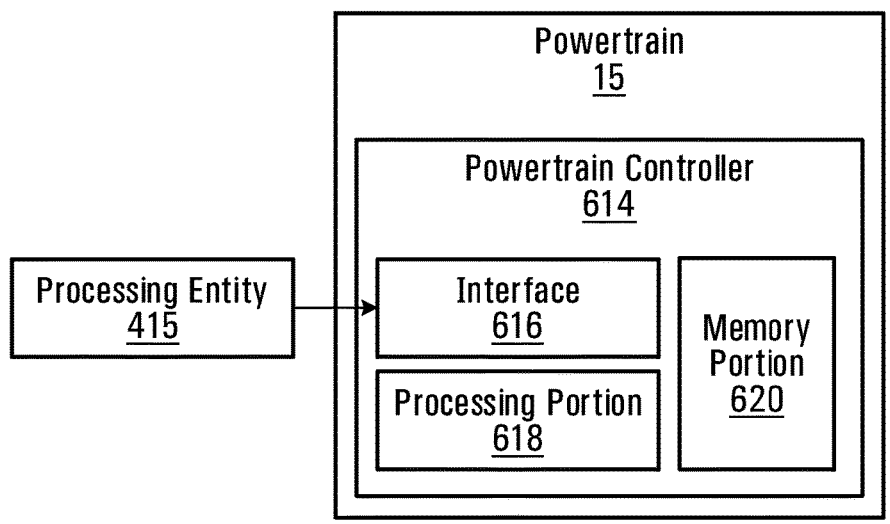
Figure 67:
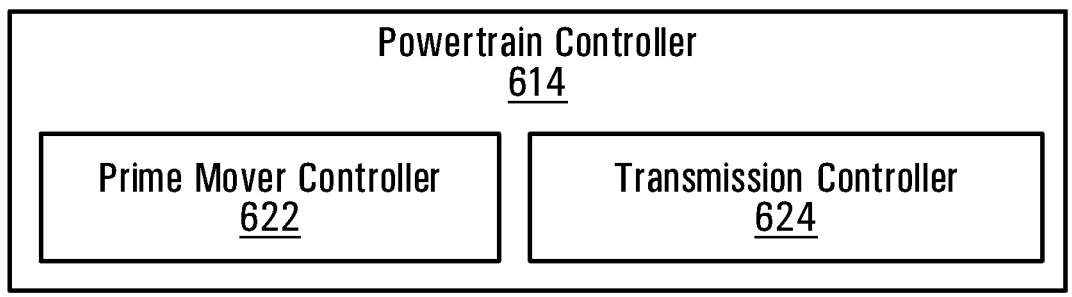

In some embodiments, as shown in FIGS. 66 and 67, the output signal issued by the processing entity 415 may be directed to a powertrain controller 614 of the powertrain 15. The powertrain controller 614 is configured for controlling operation of the powertrain 15.

More particularly, in this embodiment, the powertrain controller 614 is an electronic controller that comprises suitable hardware and/or software (e.g., firmware) configured to implement its functionality. The powertrain controller 614 comprises an interface 616, a processing portion 618 and a memory portion 620.

The interface 616 allows the powertrain controller 614 to receive inputs from and release outputs to other components of the vehicle 10 to which the powertrain controller 614 is connected (i.e., directly or indirectly connected to), including, in this embodiment, the power source 14, a transmission, an accelerator and/or other components of the user interface 11, and one or more sensors (e.g., a throttle position sensor; a motor speed sensor, i.e., a sensor sensing a speed of a motor of the power source 14; a vehicle speed sensor, i.e., a sensor sensing a speed of the agricultural vehicle 10 on the ground; a motor temperature sensor; an outside environment temperature sensor; etc.). In this example, the interface 616 of the powertrain controller 614 allows the powertrain controller 614 to receive the output signal of the processing entity 415.

The processing portion 618 comprises one or more processors for performing processing operations that implement functionality of the powertrain controller 614. A processor of the processing portion 618 may be a general-purpose processor executing program code stored in the memory portion 620. Alternatively, a processor of the processing portion 118 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 620 comprises one or more memories for storing program code executed by the processing portion 618 and/or data used during operation of the processing portion 618. A memory of the memory portion 620 may be a semiconductor memory (e.g., read-only memory (ROM) and/or random-access memory (RAM)), a magnetic storage medium, an optical storage medium, and/or any other suitable type of memory.

More particularly, in this embodiment, the powertrain controller 614 comprises a prime mover controller 622 and a transmission controller 624. For instance, in embodiments in which the power source 14 comprises an internal combustion engine and the transmission is an automatic transmission, the prime mover controller 622 may be an engine control unit (ECU) and the transmission controller 624 may be a transmission control unit (TCU). Such ECUs and TCUs are well understood by those skilled in the art. In some cases, the powertrain controller 614 may be a distributed controller in which the prime mover controller 622 and the transmission controller 624 are physically distinct from one another and may be connected to one another via a bus (e.g., a controller-area network (CAN) bus or other suitable bus). In other cases, the prime mover controller 622 and the transmission controller 624 may be functional entities of a single physical control module (e.g., a powertrain control module (PCM)).

Figure 68:
Figure 69:
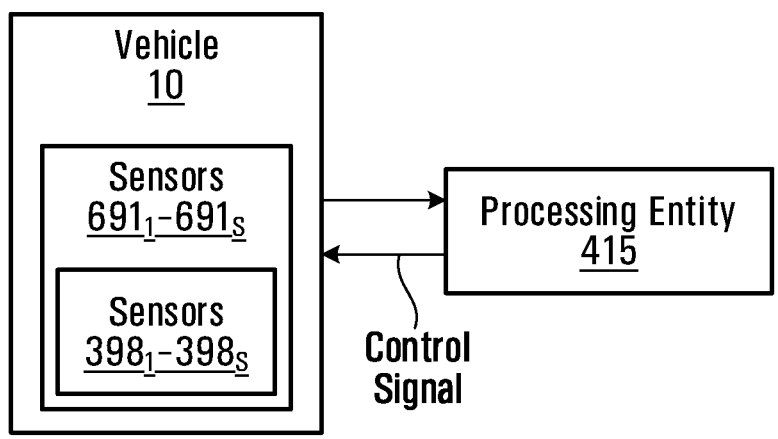
Figure 70:
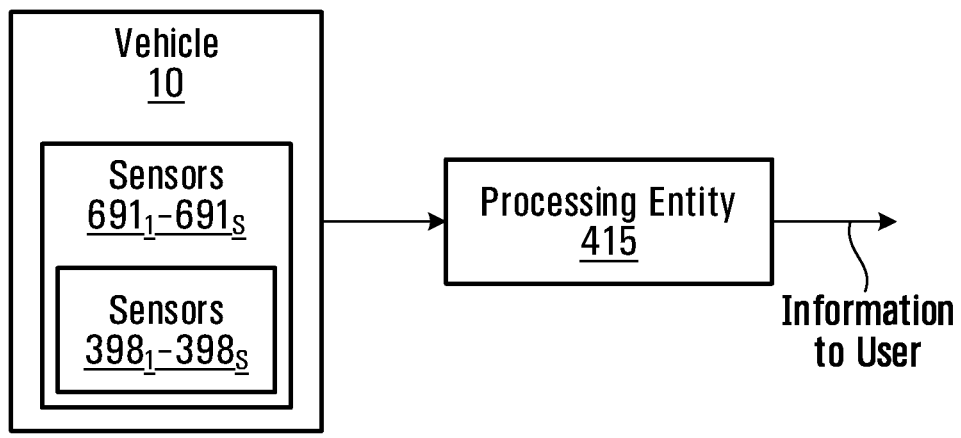

In other embodiments, as shown in FIGS. 68 to 70, the output signal issued by the processing entity 415 may be directed to the communication device 430 for communicating information regarding the operation of the vehicle 10 to a user, such as the operator of the vehicle 10, when the track 22 contacts the curb or other object 72 on the ground.

For example, in some embodiments, the communication device 430 may issue a notification 440 to notify the operator of contact between the track 22 and the curb or other object 72 on the ground. For instance, in this embodiment, the notification 440 may be output visually on the display and/or audibly on the speaker of the communication device 430.

In some embodiments, the processing entity 415 may take actions as described above, including controlling the vehicle 10 (e.g., stopping the vehicle 10) and/or communicating with a user such as the operator, before the track 22 contacts the curb or other object 72 on the ground by anticipating occurrence of contact between the track 22 and the curb or other object 72 on the ground and avoiding occurrence of such contact. For example, in some embodiments, as shown in FIGS. 69 and 70, this may be achieved based on one or more monitoring devices $691_1$-$691_s$ of the vehicle 10, which may include the sensors $398_1$-$398_s$ of the track 22 and/or one or more other sensors and/or other one or more monitoring elements of the vehicle 10, such as a camera (e.g., video, stereoscopic, etc.) and/or other imaging device, a Light Detection and Ranging (LIDAR) device, a radar device, a wheel speed sensor, a GPS and/or other location sensor, and/or any other suitable sensing device. For instance, in some embodiments, upon processing information derived from the $691_1$-$691_s$ (e.g., an image, a LIDAR input, a location relative to a map of known objects, etc.), the processing entity 415 may determine that, based on a current trajectory of the vehicle 10, contact between the track 22 and the curb or other object 72 on the ground would occur and may proceed to control the vehicle 10 (e.g., stop the vehicle 10) and/or communicate with a user such as the operator (e.g., issue a notification) to avoid occurrence of such contact.

While in embodiments considered above the off-road vehicle 10 is a construction vehicle, in other embodiments, the vehicle 10 may be another type of work vehicle such as an agricultural vehicle (e.g., a combine harvester, another type of harvester, a tractor, etc.) for performing agricultural work, a forestry vehicle (e.g., a feller-buncher, a tree chipper, a knuckleboom loader, etc.) for performing forestry work, or a military vehicle (e.g., a combat engineering vehicle (CEV), etc.) for performing military work, or may be any other type of vehicle operable off paved roads. Although operable off paved roads, the vehicle 10 may also be operable on paved roads in some cases. Also, while in embodiments considered above the off-road vehicle 10 is driven by a human operator in the vehicle 10, in other embodiments, the vehicle 10 may be an unmanned ground vehicle (e.g., a teleoperated or autonomous unmanned ground vehicle).

Any feature of any embodiment discussed herein may be combined with any feature of any other embodiment discussed herein in some examples of implementation.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for purposes of description, but should not be limiting. Various modifications and enhancements will become apparent to those of ordinary skill in the art.

The invention claimed is:

1. A track for a vehicle, the track being mountable around a track-engaging assembly comprising a plurality of wheels, the track comprising:
a ground-engaging outer side;
an inner side opposite to the ground-engaging outer side and comprising a plurality of wheel-contacting projections for contacting the wheels;
elastomeric material allowing the track to flex around the track-engaging assembly; and
a plurality of cores disposed in the elastomeric material, extending transversally to a longitudinal direction of the track, and spaced apart in the longitudinal direction of the track, each core comprising:
a wheel engager for engaging the wheels; and
a pair of wings extending from the wheel engager in a longitudinal direction of the core, the wheel engager being disposed between the wings in the longitudinal direction of the core, each wing being configured to flex in the longitudinal direction of the core to allow the wing to deflect in a thicknesswise direction of the track;
wherein each core comprises a material that is flexible and makes up at least most of the wheel engager of the core and each of its wings of the core and wherein the material of the core is anisotropic and has mechanical properties that are different in the longitudinal direction of the core than in a widthwise direction of the core.

2. The track of claim 1, wherein a longitudinal stiffness of a given one of the wings of the core is no more than $10^6$ N/m.

3. The track of claim 1, wherein the core includes a plurality of materials that are different and enable flexion of the wings of the core in the longitudinal direction of the core.

4. The track of claim 1, wherein the wheel engager of the core is at least mainly made of a first material and each of the wings of the core is at least mainly made of a second material less stiff than the first material.

5. The track of claim 1, wherein a ratio of a modulus of elasticity of a material of the wings of the core over a modulus of elasticity of a material of the wheel engager of the core is no more than 0.7.

6. The track of claim 1, wherein a ratio of an elongation at break of a material of the wings of the core over an elongation at break of a material of the wheel engager of the core is at least 2.

7. The track of claim 1, wherein the wheel engager of the core includes carbon steel and each of the wings of the core includes spring steel.

8. The track of claim 1, wherein the wheel engager of the core and each of the wings of the core are interconnected by overmolding.

9. The track of claim 8, wherein the wings of the core are overmolded onto the wheel engager of the core.

10. The track of claim 1, wherein: the inner side of the track comprises an inner surface from which project the wheel-contacting projections; the ground-engaging outer side of the track comprises a ground-engaging outer surface and a plurality of traction projections projecting from the ground-engaging outer surface; and a ratio of a thickness of each of the wings of the core over a thickness of the track from the inner surface to the ground-engaging outer surface is no more than 0.6.

11. The track of claim 1, wherein a ratio of a thickness of each of the wings of the core over a height of the wheel engager of the core is no more than 0.6.

12. The track of claim 1, wherein an aspect ratio of a given one of the wings of the core is at least 10.

13. The track of claim 1, wherein the materials of the core include a metallic material and a non-metallic material.

14. The track of claim 13, wherein the non-metallic material is a polymeric material.

15. The track of claim 14, wherein the polymeric material is a composite material.

16. The track of claim 1, wherein a modulus of elasticity of the material of the core is no more than 100 GPa.

17. The track of claim 1, wherein an elongation at break of the material of the core is at least 50%.

18. The track of claim 1, wherein a longitudinal stiffness of the core is variable during use of the track.

19. The track of claim 18, wherein the longitudinal stiffness of the core decreases in response to a lateral part of the track contacting an object.

20. The track of claim 1, wherein: the wheels include a drive wheel configured to drive the track and roller wheels configured to roll on the inner side of the track; and the wheel engager comprises a drive portion for engaging the drive wheel to drive the track and a wheel guide that projects on the inner side of the track for contacting the roller wheels.

21. The track of claim 20, wherein the wheel guide comprises a pair of guide projections that project on the inner side of the track.

22. A track for a vehicle, the track being mountable around a track-engaging assembly comprising a plurality of wheels, the track comprising:
a ground-engaging outer side;
an inner side opposite to the ground-engaging outer side and comprising a plurality of wheel-contacting projections for contacting the wheels;
elastomeric material allowing the track to flex around the track-engaging assembly; and
a plurality of cores disposed in the elastomeric material, extending transversally to a longitudinal direction of the track, and spaced apart in the longitudinal direction of the track, each core comprising:
a wheel engager for engaging the wheels; and
a pair of wings extending from the wheel engager in a longitudinal direction of the core, the wheel engager being disposed between the wings in the longitudinal direction of the core, each wing being configured to flex in the longitudinal direction of the core to allow the wing to deflect in a thicknesswise direction of the track;
wherein a longitudinal stiffness of the core is variable during use of the track and wherein the core comprises a mechanical joint movable to allow flexion of a given one of the wings of the core in response to a lateral part of the track contacting an object.

23. The track of claim 22, wherein the mechanical joint comprises a pivot pivotable to allow flexion of the given one of the wings of the core in response to the lateral part of the track contacting the object.

24. The track of claim 22, wherein the mechanical joint is changeable between a locked state in which the mechanical joint prevents the given one of the wings from flexing relative to the wheel engager of the core and an unlocked state in which the mechanical joint allows the given one of the wings to flex relative to the wheel engager of the core.

25. The track of claim 24, wherein the core comprises an actuator operable to change the mechanical joint of the core between the locked state and the unlocked state.

26. The track of claim 25, wherein the actuator is operable to change the mechanical joint of the core between the locked state and the unlocked state in response to a command.

27. The track of claim 26, wherein the command is generated automatically by a processing entity.

28. The track of claim 26, wherein the command is provided to a processing entity by an individual.

29. The track of claim 22, wherein the longitudinal stiffness of the core decreases in response to a lateral part of the track contacting an object.

30. A track for a vehicle, the track being mountable around a track-engaging assembly comprising a plurality of wheels, the track comprising:
a ground-engaging outer side;
an inner side opposite to the ground-engaging outer side and comprising a plurality of wheel-contacting projections for contacting the wheels;
elastomeric material allowing the track to flex around the track-engaging assembly; and
a plurality of cores disposed in the elastomeric material, extending transversally to a longitudinal direction of the track, and spaced apart in the longitudinal direction of the track, each core comprising:
a wheel engager for engaging the wheels; and
a pair of wings extending from the wheel engager in a longitudinal direction of the core, the wheel engager being disposed between the wings in the longitudinal direction of the core, each wing being configured to flex in the longitudinal direction of the core to allow the wing to deflect in a thicknesswise direction of the track; wherein a longitudinal stiffness of the core is variable during use of the track and wherein the track further comprises a sensor, wherein the longitudinal stiffness of the core is variable based on an output of the sensor.

31. The track of claim 30, wherein the sensor is configured to sense contact of the track with an object.

32. The track of claim 31, wherein the longitudinal stiffness of the core is decreased when the sensor senses the contact of the track with the object.

33. The track of claim 31, wherein the longitudinal stiffness of the core is increased when the sensor senses that the track cleared the object.

34. The track of claim 30, wherein the longitudinal stiffness of the core decreases in response to a lateral part of the track contacting an object.

* * * * *